(12) United States Patent
Hurt

(10) Patent No.: US 11,780,073 B2
(45) Date of Patent: Oct. 10, 2023

(54) HANDLE WITH OFFSET CONNECTOR

(71) Applicant: Patricia Hurt, Saint Cloud, MN (US)

(72) Inventor: Patricia Hurt, Saint Cloud, MN (US)

(*) Notice: Subject to any disclaimer, the term of this patent is extended or adjusted under 35 U.S.C. 154(b) by 346 days.

(21) Appl. No.: 17/155,075

(22) Filed: Jan. 21, 2021

(65) Prior Publication Data

US 2022/0168885 A1 Jun. 2, 2022

Related U.S. Application Data

(60) Provisional application No. 62/964,076, filed on Jan. 21, 2020.

(51) Int. Cl.

| | | |
|---|---|---|
| *B25G 1/10* | (2006.01) | |
| *B25G 1/04* | (2006.01) | |
| *A01B 1/02* | (2006.01) | |
| *B25G 3/04* | (2006.01) | |
| *B25G 3/32* | (2006.01) | |

(52) U.S. Cl.
CPC ............ *B25G 1/102* (2013.01); *A01B 1/026* (2013.01); *B25G 1/04* (2013.01); *B25G 3/04* (2013.01); *B25G 3/32* (2013.01)

(58) Field of Classification Search
CPC . B25G 1/102; B25G 1/04; B25G 3/04; B25G 3/32; A01B 1/026
See application file for complete search history.

(56) References Cited

U.S. PATENT DOCUMENTS

| | | | |
|---|---|---|---|
| 61,784 A | 2/1867 | Wheat | |
| 157,634 A | 12/1874 | Reagan | |
| 161,678 A | 4/1875 | Gardner | |
| 184,918 A | 11/1876 | Siddall | |
| 239,126 A | 3/1881 | Wagner | |
| 245,542 A | 8/1881 | Moran | |
| 264,527 A | 9/1882 | Haley | |
| 264,798 A | 9/1882 | Tyler | |
| 296,879 A | 4/1884 | Scollay | |
| 309,437 A | 12/1884 | Calef | |
| 347,054 A | 8/1886 | Morse | |
| 378,540 A * | 2/1888 | Brough | ............... E04C 5/165 |
| | | | 16/DIG. 40 |
| 407,571 A | 7/1889 | Calef | |
| 479,661 A | 7/1892 | Poulson | |
| 572,851 A | 12/1896 | Young | |

(Continued)

*Primary Examiner* — Jeffrey O'Brien
(74) *Attorney, Agent, or Firm* — Albert W. Watkins

(57) ABSTRACT

An offset connector subdivides a long, slender tool or implement handle. The offset connector may be provided with one or more unitary or replaceable grips. The additional grips serve as secondary or tertiary hand holds that enable more adaptable and capable ergonomic manipulation of the tool or implement. The offset connector is inserted intermediate between a primary handle grip and the tool or implement head, thereby subdividing the long slender tool or implement handle into at least two separate handle segments. Each handle segment is inserted into a handle segment receiver socket, and is affixed therein using a bolt, screw, or other fastener that is longitudinally co-axial with the longitudinal axis of the handle segment. Some embodiments establish fixed spacing between the primary handle, secondary handle, and implement. Other embodiments provide variable spacing therebetween.

8 Claims, 16 Drawing Sheets

(56) References Cited

U.S. PATENT DOCUMENTS

| | | | |
|---|---|---|---|
| 577,220 A * | 2/1897 | Whitehead | B25J 1/04 24/339 |
| 581,260 A | 4/1897 | Biddle | |
| 606,534 A | 6/1898 | Gifford | |
| 615,793 A | 12/1898 | Bowman | |
| D31,050 S | 6/1899 | De Witt | |
| 661,253 A | 11/1900 | Zimmerman | |
| 693,100 A | 2/1902 | Bell | |
| 712,843 A | 11/1902 | Paul | |
| 781,772 A | 2/1905 | Gifford | |
| 843,590 A | 2/1907 | Dunn, Jr. | |
| 930,660 A | 8/1909 | Gifford | |
| 931,838 A | 8/1909 | Beehler | |
| 969,528 A | 9/1910 | Disbrow | |
| 1,027,345 A | 5/1912 | Lapin | |
| 1,200,925 A | 10/1916 | Delamere | |
| 1,443,596 A | 1/1923 | Schaefer | |
| 1,482,858 A | 2/1924 | Nich et al. | |
| 1,503,251 A | 7/1924 | Schoof | |
| 1,529,835 A | 3/1925 | Hamilton | |
| 1,609,414 A | 12/1926 | Lenny | |
| 1,644,881 A | 10/1927 | Hokanson | |
| 1,648,354 A | 11/1927 | Lied | |
| 1,776,434 A | 9/1930 | Hokanson | |
| 1,790,466 A * | 1/1931 | Gordon | A47L 1/09 15/220.1 |
| 1,851,426 A | 3/1932 | Haskell | |
| 1,858,380 A | 5/1932 | Stoddard | |
| 1,877,125 A | 9/1932 | Evans | |
| 1,901,778 A | 3/1933 | Schlag | |
| 2,070,768 A | 2/1937 | Wright | |
| 2,116,928 A | 5/1938 | Hanneman | |
| 2,168,121 A | 8/1939 | French | |
| 2,279,324 A | 4/1942 | Julien | |
| 2,463,621 A | 3/1949 | Herzog | |
| 2,536,607 A | 1/1951 | Jenkins | |
| 2,567,565 A | 9/1951 | Keeler et al. | |
| D170,892 S | 11/1953 | Schoenwald | |
| 2,699,353 A | 1/1955 | Nagy et al. | |
| 2,724,610 A | 11/1955 | Fitzgerald | |
| 2,737,060 A | 3/1956 | Russell | |
| 2,951,482 A | 9/1960 | Sullivan | |
| 3,014,750 A * | 12/1961 | Briggs | A01B 1/026 294/58 |
| 3,024,031 A | 3/1962 | Davidson | |
| 3,155,414 A | 11/1964 | Bales | |
| 3,222,699 A | 12/1965 | Zeisig | |
| 3,226,149 A | 12/1965 | McJohnson | |
| 3,268,968 A | 8/1966 | Crickmer | |
| 3,372,509 A | 3/1968 | Arsenault | |
| 3,372,510 A | 3/1968 | Arsenault | |
| D215,081 S | 9/1969 | Zagwyn | |
| 3,549,189 A | 12/1970 | Alosi | |
| 3,751,804 A | 8/1973 | Pulrang | |
| 3,949,817 A | 4/1976 | Rice | |
| D240,678 S | 7/1976 | Herig | |
| 4,128,266 A | 12/1978 | Vaslas | |
| 4,129,327 A | 12/1978 | Moore, Jr. | |
| D251,566 S | 4/1979 | Moen | |
| 4,147,348 A | 4/1979 | Lee | |
| 4,155,582 A | 5/1979 | Reisner | |
| 4,197,764 A | 4/1980 | Auernhammer | |
| 4,263,690 A | 4/1981 | Dobosi | |
| 4,264,096 A | 4/1981 | Barnett | |
| 4,265,475 A | 5/1981 | Jarvis | |
| 4,280,727 A | 7/1981 | Germain | |
| 4,378,718 A | 4/1983 | Kraft et al. | |
| 4,387,483 A | 6/1983 | Larrabee | |
| 4,471,842 A | 9/1984 | Fox | |
| 4,495,669 A | 1/1985 | Hooper | |
| 4,537,433 A | 8/1985 | Yang | |
| 4,548,092 A | 10/1985 | Strong, Jr. | |
| 4,549,611 A | 10/1985 | Mills | |
| D281,393 S * | 11/1985 | Karnhag | D6/552 |
| D283,743 S | 5/1986 | Moser | |
| 4,615,553 A | 10/1986 | Hultine | |
| 4,653,142 A * | 3/1987 | Upton | A47L 13/24 403/350 |
| 4,690,447 A | 9/1987 | Adams | |
| 4,704,758 A * | 11/1987 | Hoffman | B25G 1/04 56/DIG. 18 |
| 4,730,632 A | 3/1988 | Mace | |
| 4,787,661 A | 11/1988 | Rutledge | |
| D300,713 S | 4/1989 | Trapasso | |
| D303,068 S | 8/1989 | Zabarte | |
| 4,930,181 A | 6/1990 | Johnson | |
| 4,951,956 A | 8/1990 | Vittone | |
| 4,958,407 A | 9/1990 | Johnson | |
| 5,065,475 A | 11/1991 | Watt | |
| 5,133,101 A | 7/1992 | Hauser et al. | |
| 5,133,582 A | 7/1992 | Rocha | |
| 5,145,210 A | 9/1992 | Lennon | |
| D334,525 S | 4/1993 | Adams | |
| D339,731 S | 9/1993 | Stewart | |
| D339,732 S | 9/1993 | Stewart | |
| D360,123 S | 7/1995 | Shu | |
| 5,451,085 A * | 9/1995 | Wagner | A01B 1/22 294/58 |
| 5,493,758 A | 2/1996 | Carmien | |
| 5,496,085 A | 3/1996 | Middleton | |
| 5,522,629 A | 6/1996 | Loo | |
| 5,529,357 A | 6/1996 | Hoffman | |
| 5,533,768 A | 7/1996 | Mitchell | |
| 5,544,935 A | 8/1996 | Cone, II et al. | |
| D373,944 S | 9/1996 | Thompson et al. | |
| 5,581,915 A | 12/1996 | Lobato | |
| D377,300 S | 1/1997 | Fredrick von Essen | |
| 5,595,532 A | 1/1997 | McCracken | |
| 5,606,772 A | 3/1997 | Ilic | |
| 5,651,581 A | 7/1997 | Myers et al. | |
| D387,263 S | 12/1997 | Bidstrup et al. | |
| 5,695,231 A | 12/1997 | Hoffman | |
| D388,684 S | 1/1998 | Irwin | |
| 5,771,535 A | 6/1998 | Blessing | |
| D396,624 S | 8/1998 | Basilius | |
| 5,787,588 A | 8/1998 | Tisbo et al. | |
| 5,799,996 A | 9/1998 | Fredrickson | |
| 5,802,960 A | 9/1998 | Graj et al. | |
| 5,810,408 A * | 9/1998 | Armstrong | A46B 5/0075 294/51 |
| 5,813,206 A | 9/1998 | McKittrick | |
| 5,830,047 A | 11/1998 | McCracken | |
| D401,833 S | 12/1998 | Whitehead et al. | |
| 5,926,895 A | 7/1999 | Roy | |
| 5,937,627 A | 8/1999 | McKittrick | |
| 5,943,796 A | 8/1999 | Hedstrom | |
| 5,979,005 A | 11/1999 | Lecce | |
| D418,734 S | 1/2000 | Ritrovato et al. | |
| 6,023,924 A | 2/2000 | Babineau | |
| D427,494 S | 7/2000 | Yacobi | |
| 6,101,657 A | 8/2000 | Hamilton | |
| 6,101,909 A | 8/2000 | Djie | |
| 6,122,792 A | 9/2000 | Roy | |
| D432,891 S | 10/2000 | Sterling | |
| 6,168,507 B1 | 1/2001 | McCracken | |
| 6,199,245 B1 * | 3/2001 | Blessing | B25G 1/102 16/901 |
| 6,203,081 B1 | 3/2001 | Kegan, Sr. | |
| 6,203,626 B1 * | 3/2001 | Biggs | B25G 1/04 134/42 |
| 6,343,822 B1 | 2/2002 | Badura | |
| D459,642 S | 7/2002 | Haquin | |
| 6,434,793 B1 | 8/2002 | Ensson | |
| 6,460,911 B1 | 10/2002 | Engelsiepen | |
| D466,389 S | 12/2002 | Clivio | |
| D468,618 S | 1/2003 | Ho | |
| 6,564,426 B1 | 5/2003 | Wang | |
| 6,601,887 B2 | 8/2003 | Graves | |
| D487,010 S | 2/2004 | Marquardt et al. | |
| 6,725,491 B2 | 4/2004 | Hung | |
| D493,685 S | 8/2004 | Dallas | |
| 6,798,348 B1 | 9/2004 | Wilker et al. | |
| 6,814,156 B2 | 11/2004 | Dieterle et al. | |
| 6,830,271 B2 | 12/2004 | Piscopo et al. | |

(56) References Cited

U.S. PATENT DOCUMENTS

| | | | |
|---|---|---|---|
| 6,871,377 B2 | 3/2005 | Veltrop et al. | |
| D514,917 S | 2/2006 | Coudurier | |
| 7,032,942 B2 | 4/2006 | Stuart | |
| D528,398 S | 9/2006 | Meyer et al. | |
| D544,330 S | 6/2007 | Hurley | |
| 7,290,311 B2 * | 11/2007 | Vosbikian | B65D 71/0096 16/427 |
| 7,331,620 B2 | 2/2008 | Wang | |
| 7,350,839 B2 | 4/2008 | Marquardt et al. | |
| 7,396,187 B1 | 7/2008 | Meyers | |
| 7,398,579 B2 | 7/2008 | Moshenrose | |
| D580,732 S | 11/2008 | Meagher et al. | |
| 7,637,882 B2 | 12/2009 | Carman, Jr. et al. | |
| D611,321 S | 3/2010 | Boies et al. | |
| D627,619 S | 11/2010 | Demers et al. | |
| 7,836,557 B2 | 11/2010 | Baker | |
| 7,891,902 B2 | 2/2011 | Pettey | |
| 8,002,322 B2 | 8/2011 | Rathmell et al. | |
| 8,006,351 B2 | 8/2011 | Baker | |
| 8,065,774 B2 | 11/2011 | Schiesz et al. | |
| 8,108,966 B1 | 2/2012 | Viviano | |
| 8,152,396 B2 | 4/2012 | Kuykendall | |
| D668,128 S | 10/2012 | Masalin et al. | |
| D676,723 S * | 2/2013 | Norwood | A46B 5/0075 D8/10 |
| 8,381,358 B1 | 2/2013 | Frey | |
| 8,387,263 B1 | 3/2013 | Roberts | |
| D686,477 S | 7/2013 | Pookrum | |
| D690,183 S | 9/2013 | Lee | |
| D697,783 S | 1/2014 | Chesner | |
| 8,640,295 B2 | 2/2014 | Schiesz et al. | |
| 8,683,896 B2 | 4/2014 | Gerbec et al. | |
| 8,714,607 B1 | 5/2014 | Suber | |
| D706,594 S | 6/2014 | Workman et al. | |
| 8,740,272 B2 | 6/2014 | Walden et al. | |
| 8,776,648 B2 | 7/2014 | Lee | |
| 8,832,898 B1 | 9/2014 | Stimach | |
| D716,119 S | 10/2014 | Elston | |
| 9,163,372 B1 | 10/2015 | Elston | |
| 9,498,877 B1 | 11/2016 | Henry | |
| 9,643,311 B1 | 5/2017 | Cowie | |
| 9,731,409 B2 | 8/2017 | Meinzer et al. | |
| 9,757,851 B2 | 9/2017 | Meinzer et al. | |
| 9,889,550 B1 * | 2/2018 | McNeny | B25G 1/04 |
| D825,295 S | 8/2018 | Roberts | |
| 10,161,092 B2 | 12/2018 | Lovell | |
| 2003/0116982 A1 * | 6/2003 | Nicolay | B25G 1/00 294/57 |
| 2005/0153606 A1 | 7/2005 | Lane et al. | |
| 2013/0193700 A1 | 8/2013 | Walden | |
| 2013/0327191 A1 * | 12/2013 | Wason | G05G 11/00 81/489 |
| 2015/0098822 A1 | 4/2015 | Lee | |
| 2015/0121728 A1 | 5/2015 | Spataro et al. | |
| 2015/0123413 A1 * | 5/2015 | Spataro | E01H 5/02 294/54.5 |
| 2019/0246867 A1 * | 8/2019 | Ziamandanis | B25G 1/04 |
| 2019/0291262 A1 * | 9/2019 | Bunker | E01H 5/02 |
| 2019/0357436 A1 * | 11/2019 | Hamilton | A01B 1/026 |

* cited by examiner

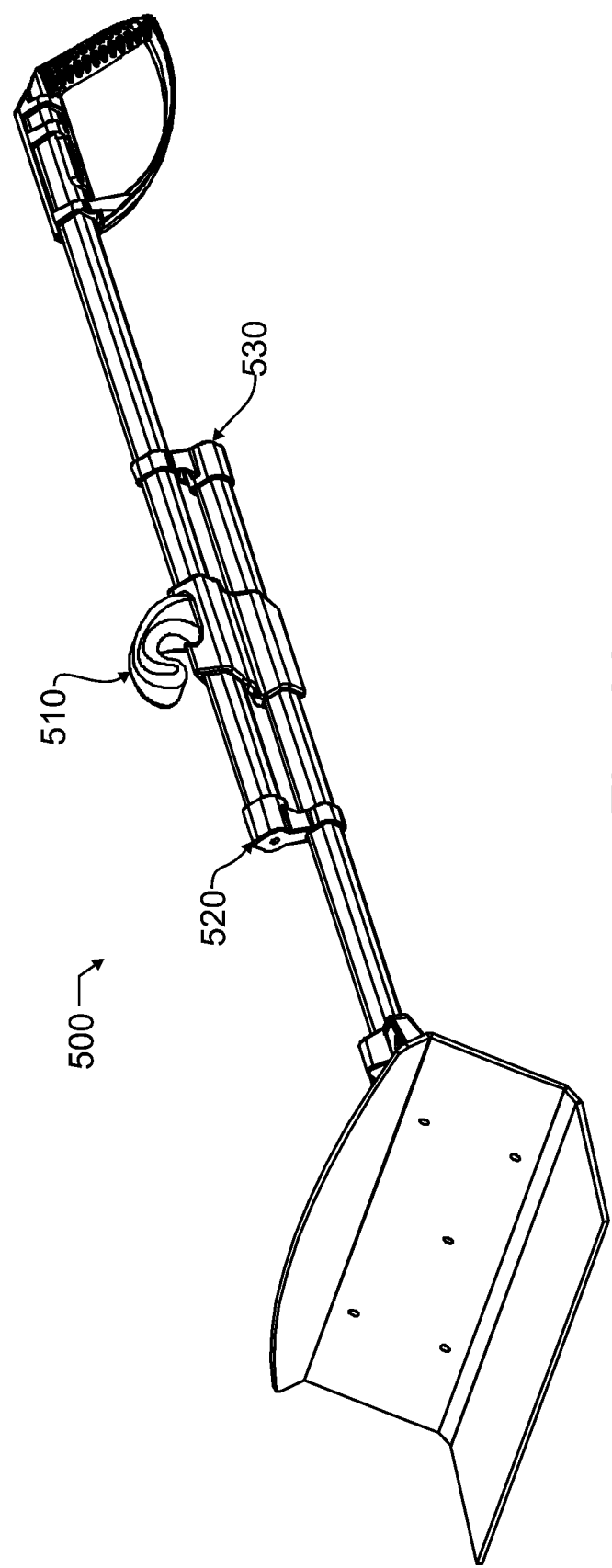

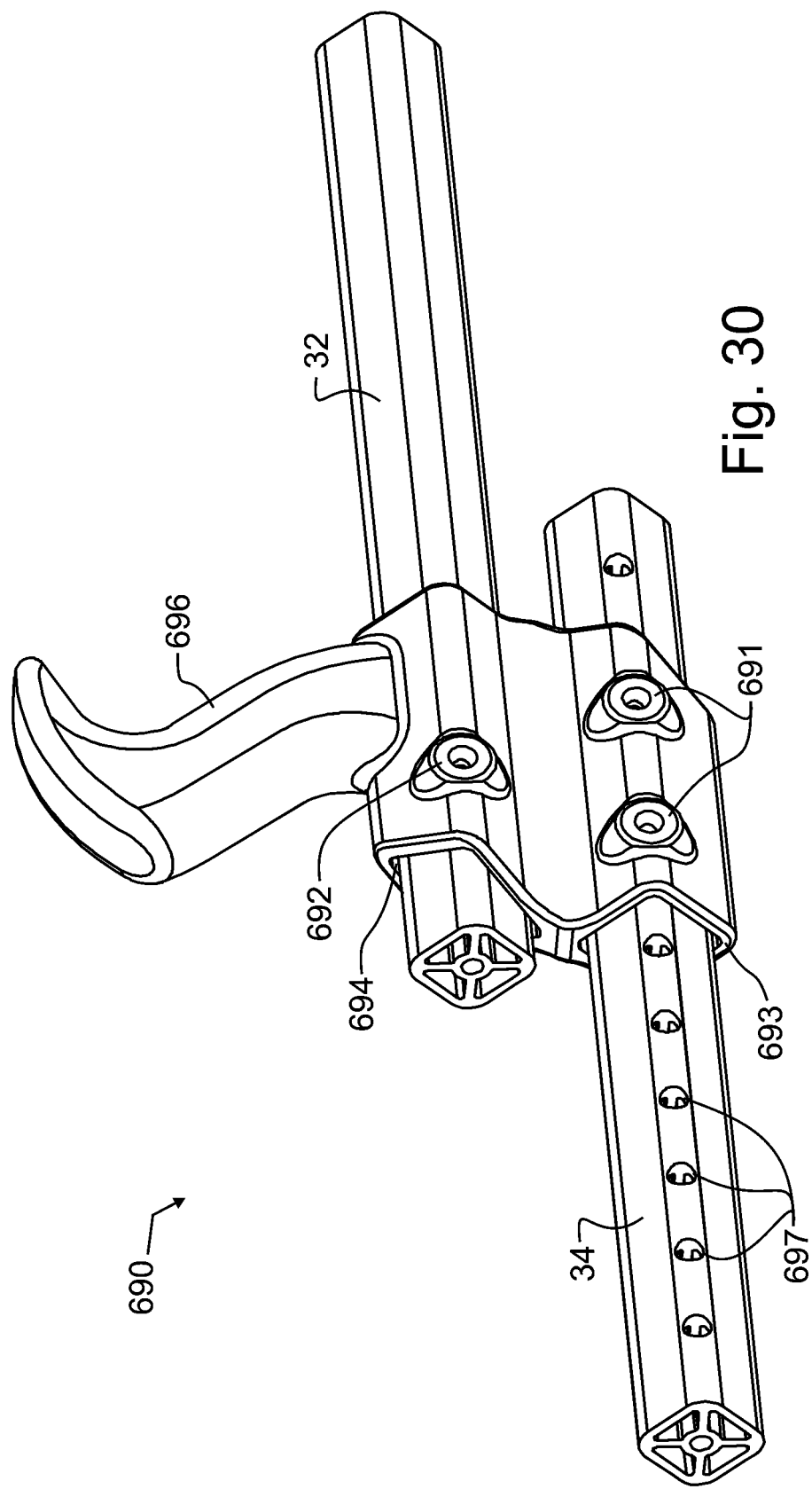

HANDLE WITH OFFSET CONNECTOR

CROSS REFERENCE TO RELATED APPLICATIONS

The present application claims the benefit of U.S. provisional patent application 62/964,076 filed Jan. 21, 2020 of like title and inventorship, the teachings and entire contents which are incorporated herein by reference.

BACKGROUND OF THE INVENTION

1. Field of the Invention

The present invention pertains generally to tool and implement handles, and more particularly to a detachable and collapsible handle that may be used with one or a variety of diverse tools and implements.

2. Description of the Related Art

Shovels, rakes, hoes, and many other hand tools and implements have long handles that allow a person to operate the tools and implements from a generally upright stance. This upright stance is more comfortable than leaning over or down, since the load is primarily carried upon an essentially vertically columnar spine which requires the musculature to only provide stabilization or nominal force. The benefit of remaining in an upright stance is especially great when the work is for extended periods, or would otherwise require repetitive bending down and standing back up. In addition to being more comfortable and natural, with an appropriate handle length a person is still postured well to "lean in" to the implement, and gain much body weight advantage to facilitate the task at hand. This can be very important and beneficial for those moments or short periods requiring greater force on the tool or implement, such as digging into the earth with a hoe or breaking packed snow or ice free from a sidewalk with a shovel.

These hand tools and implements ordinarily utilize set screws, nails, rivets, pins, bolts, or other fasteners inserted through the implement head at a ninety degree angle to the handle longitudinal axis. The fastener passes through the implement head into or even entirely through the handle, to secure the long handle to the implement head. While there are a myriad of such implements known and in use, one exemplary U.S. patent, the teachings which are incorporated herein by reference, is U.S. Pat. No. 6,023,924 by Babineau, entitled "Easy grip tool". As shown therein in FIGS. 5 and 6, a set screw 46 is threaded through the implement and engages with the handle.

Unfortunately, the long handle makes it difficult and expensive to ship these implements individually, owing to the large package size. Thus the common practice is to ship them to a retail outlet in bulk. Even when stacked together, the implements still require substantial shipping and storage space, most of which is simply empty space. Every linear foot of retail shelf space consumed equates to less options for products that a consumer will buy, and inventory storage space equates to expense. As a result, the store doesn't want to allocate any extra retail shelf or back room storage space and incur the associated expense or lost revenue to hold excess inventory for these bulkier, relatively low priced products. Nevertheless, for exemplary purposes describing snow shovels, in the event of a major snow storm retail stores will commonly sell out of snow shovels long before the customer demand for snow shovels has been met.

Making matters worse, fasteners that secure an implement head to handle by passing through the implement head into the handle often prematurely break on the implements. The fastener must be of small diameter, so that the hole needed for the fastener does not detract too much from the strength of the handle in the vicinity of the fastener. However, this small diameter also means that impacts between the handle and implement create great shearing force across the small cross-section or diameter of the fastener. These major shear forces can lead to immediate failure, or work hardening followed by subsequent failure of the fastener, or deformation of the holes that the fastener passes through. As the holes progressively deform more, in either or both of the handle and tool head, more momentum builds in relative motion between the handle and tool head in advance of the next impact. This means that the more the holes wear, the greater the shear force across the fastener and the greater the wear and deformation of the holes.

In some designs, such as the Babineau patent incorporated by reference herein above, the fastener such as a set screw is of greater diameter, but only passes through the implement head to press against the exterior of the handle. This preserves strength in the elongate handle. However, with this arrangement the fastener will even more quickly loosen relative to the handle, leading to very objectionable wobble, and quickly from there to failure.

Some manufacturers have designed certain product lines to address some of the aforementioned limitations. For example, it is common practice for many large floor brooms to provide male threads on one end of a long slender handle, and a female threaded coupling formed into the brush block. For shipping and storage the handle and brush block are unscrewed from each other, and then the brush block long axis is oriented to align in parallel arrangement with the longitudinal axis of the handle. While the shipping carton must still be slightly longer than the handle length, the overall carton length does not have to add even more length to accommodate the combined length of both the handle and the implement. The carton width is also reduced, from the greatest dimension of implement head down to the next smaller dimension, which in the case of a several foot wide brush block can be substantially smaller. Consequently, this re-arrangement for shipping and storage significantly reduces the space required.

While threaded couplings are very common for brooms, the threaded coupling adds manufacturing cost and will allow rotation between the broom head and handle during use. Rotation of an implement head relative to implement handle is undesirable, if not completely unacceptable, for most tools and implements. Consequently, the extra cost and inconvenience of these basic threaded couplings has prevented them from being widely accepted for most other tools and implements.

To further reduce the shipping and storage space required, some resourceful tool and implement manufacturers over the years have split the handle from one long member into two shorter sections. In many of these cases, prior to using the tool or implement the two shorter sections are rejoined longitudinally end-to-end, sometimes with slight overlap, by inserting fasteners perpendicular to the longitudinal axis of the shortened handle sections to securely join them together. Some of these apparatuses also incorporate a reinforcing collar that circumscribes the junction of the two shorter sections, whether the junction is an overlapping one or not, and the fasteners pass through the reinforcing collar. Exemplary U.S. patents, the teachings which are incorporated herein by reference, include: U.S. Pat. No. 572,851 by Young, entitled "Handle Attachment"; U.S. Pat. No. 577,220 by Whitehead, entitled "Extensible broom handle"; U.S. Pat. No. 843,590 by Dunn, entitled "Household Cleaning appliance"; U.S. Pat. No. 2,168,121 by French, entitled "Ceiling and wall cleaner"; U.S. Pat. No. 2,724,610 by Fitzgerald, entitled "Golf ball retriever"; and U.S. Pat. No. 5,493,758 by Carmien, entitled "Extension pole".

Unfortunately, the reinforcing collar fasteners suffer from problems similar to the fasteners used to hold the implement head to handle, including loosening and breaking. When these reinforcing collar fasteners come loose during tool use, the handle will wobble and ultimately split or break, preventing further use of the long-handled tool.

While better than not for most tasks, for some tasks or manipulations the long slender handles can also be ergonomically deficient. Occasionally a tool user is undesirably forced into awkward and relatively weak positions that can lead to great physical stress or injury. This limitation is of course in addition to the shipping and storage challenges faced by prior art tools and implements.

Many artisans over the years have improved the ergonomics of an ordinary long slender shaft-style handle by coupling a secondary grip intermediate along the long handle. This allows a person to both grasp the long handle and also grasp the intermediate grip, which greatly improves the associated ergonomics. While there have been many such grips that, for exemplary and non-limiting purpose, are designed to clamp around an intermediate portion of the long handle, many of these grips can be dangerous to use. In the event of a heavy load or torque placed upon the implement, such as an off-balance heavy shovel, the secondary grip can unexpectedly slip, allowing the shaft to rotate. Likewise, the grip may unexpectedly slide along the longitudinal axis of the shaft. Both of these sudden shifts can lead to sudden unexpected changes in the balance of the load, which very commonly will force a person to reload, clean up, or redo a task. While albeit uncommon, in some instances this sudden unexpected change in the load balance can also very undesirably result in injury.

To reduce the chance of unexpected rotational shifts, a few artisans have devised a second intermediate grip in combination with a non-rotatable long handle. Exemplary U.S. patents, the teachings which are incorporated herein by reference, include: U.S. Pat. Nos. 606,534 and 781,772, each by Gifford and entitled "Snow Shovel," and both which clamp around a rectangular shaft but which can still slide longitudinally unexpectedly; and Des U.S. Pat. No. 377,300 by Fredrick von Essen, entitled "Two-handled shovel," which bolts a grip through the long-handle, thereby suffering the fatiguing and durability issues of transverse fasteners described herein above. None of these three patents addresses the space limitations for storage and shipping of long handle tools and implements.

U.S. Pat. No. 9,889,550 by McNeny et al, entitled "Step down handle for a hand tool", the teachings which are incorporated herein by reference, discloses an intermediate grip that addresses both ergonomic issues and space limitations for storage and shipping of long handle tools and implements. Nevertheless the McNeny et al handle incorporates transverse fasteners, thereby suffering the fatiguing and durability issues associated with transverse fasteners already described herein above.

In contrast to the McNeny et al handle, Des. 676,723 by Norwood et al, entitled "Two handled shovel," the teachings which are incorporated by reference herein, illustrates what appears to be a long handle of unitary construction having an ergonomic geometry that addresses ergonomic issues and fatiguing and durability issues of transverse fasteners, but which instead fails to address space limitations for storage and shipping of long handle tools and implements.

While each of these immediately aforementioned second handles are provided with grips very close to the long handle, other artisans have devised implements and tools with two long handles, sometimes where the angle between the two long handles can be varied. Exemplary U.S. patents, the teachings which are incorporated herein by reference, include: U.S. Pat. No. 4,129,327 by Moore, entitled "Shovel"; U.S. Pat. No. 4,787,661 by Rutledge, entitled "Adjustable double handled shovel"; U.S. Pat. No. 5,133,582 by Rocha, entitled "Two-handed shovel"; U.S. Pat. No. 7,331,620 by Wang, entitled "Shovel capable of facilitating the operation of throwing shoveled objects off"; U.S. Pat. No. 9,163,372 by Elston, entitled "Three handled snow shovel"; and Des 716,119 by Elston, entitled "Shovel". For some applications, these designs may offer much benefit. However, these multiple long handle constructions also run the risk of sudden and unexpected repositioning and associated injury. In addition, these configurations are not intuitive, and so lack more universal appeal. Finally, these configurations also fail to address the shipping and inventory problems associated with a long handle, and instead make any modifications needed to address shipping and inventory space requirements far more complicated to incorporate.

Other artisans have devised various configurations of multi-sections, multi-handles, and multi-implements. Exemplary U.S. patents, the teachings which are incorporated herein by reference, include: U.S. Pat. No. 5,799,996 by Fredrickson, entitled "Multi-function hand tool," which describes prior art threaded couplings that can rotate under load; U.S. Pat. No. 5,937,627 by McKittrick, entitled "Gardening implement having enhanced leverage," which describes a conventional chuck such as found on a drill to add and remove tool heads; U.S. Pat. No. 6,199,245 by Blessing, entitled "Multi-component lawn and garden handle," which describes a wide variety of couplings that suffer from the limitations of the transverse fasteners such as nails, screws, pins and the like found in the basic tools and implements most commonly commercially sold; U.S. Pat. No. 8,740,272 by Walden et al, entitled "Ergonomically designed multi-handled tool," which describes a variety of tool implements, but fails to teach any new way to affix the tools into position, merely stating that any suitable mechanism can be used; U.S. Pat. No. 9,498,877 by Henry, entitled "Shovel with two integral handles and exterior handle," which describes in-line handles unitary with the long handle; and U.S. Pat. Nos. 9,731,409 and 9,757,851 by Meinzer et al, each entitled "outdoor tool system with interchangable modular heads," and each which describes a modular tool that suffers from the limitations of the transverse fasteners such as nails, screws, pins and the like found in the basic tools and implements most commonly commercially sold. So while most of these immediately aforementioned multi-section, multi-handle, and multi-implement configurations address shipping constraints well, excepting the unitary construction of Henry, they still suffer from the reliability limitations of the threaded or transverse fasteners commonplace in the prior art.

Some artisans have devised apparatus that incorporate end-affixed shafts or handles for different and diverse purpose from the present invention. Exemplary U.S. patents, the teachings which are incorporated herein by reference, include: U.S. Pat. No. 4,265,475 by Jarvis, entitled "Snow handling apparatus"; U.S. Pat. No. 4,387,483 by Larabee, entitled "Extracting handle for earth drill augers"; U.S. Pat.

No. 4,471,842 by Fox, entitled "Hand tool having blade and two portion handle secured together by threaded bolt"; U.S. Pat. No. 4,549,611 by Mills, entitled "Multi-purpose hand tool"; and U.S. Pat. No. 7,891,902 by Pettey, entitled "Hobby servo shaft adapter".

Other artisans have devised single handle implements and tools that incorporate a non-rotatable shaft. Exemplary U.S. patents and published applications, the teachings which are incorporated herein by reference, include: U.S. Pat. No. 931,838 by Beehler, entitled "Shovel"; U.S. Pat. No. 1,644,881 by Hokanson, entitled "Shovel"; U.S. Pat. No. 1,776,434 by Hokanson, entitled "Hollow-back shovel"; U.S. Pat. No. 3,024,031 by Davidson, entitled "Tool handle adapter socket"; U.S. Pat. No. 5,943,796 by Hedstrom, entitled "Roof snow removal device"; U.S. Pat. No. 8,002,322 by Rathmell et al, entitled "Multi-use snow tool"; Des 303,068 by Zabarte, entitled "Axe Mattock"; Des 427,494 by Yacobi, entitled "Handle shaft for a garden or snow tool"; Des 514,917 by Coudurier, entitled "Handle"; 2015/0121728 by Spataro et al, entitled "dual mode collapsable shovel"; and 2015/0123413 by Spataro et al, entitled "collapsable shovel handle".

A large number of additional U.S. tool and implement patents of varying relevance providing more general background content, the relevant teachings and contents which are incorporated herein by reference, include: U.S. Pat. No. 161,678 by Gardner, entitled "Lifting Attachment for shovels and forks"; U.S. Pat. No. 309,437 by Calef, entitled "Spoon"; U.S. Pat. No. 407,571 by Calef, entitled "Knife for cutting corn"; U.S. Pat. No. 479,661 by Poulson, entitled "Spade"; U.S. Pat. No. 712,843 by Paul, entitled "Pneumatic sugar cane cutter"; U.S. Pat. No. 930,660 by Gifford, entitled "Snow Shovel"; U.S. Pat. No. 1,027,345 by Lapin, entitled "Trench digging shovel"; U.S. Pat. No. 1,901,778 by Schlag, entitled "Hoe"; U.S. Pat. No. 2,463,621 by Herzog, entitled "Detachable handle connection"; U.S. Pat. No. 2,536,607 by Jenkins, entitled "Broom rake"; U.S. Pat. No. 3,014,750 by Briggs, entitled "Easy hold shovel handle"; U.S. Pat. No. 3,155,414 by Bales, entitled "Handle"; U.S. Pat. No. 4,128,266 by Vaslas, entitled "Auxiliary handle for long-handled implements"; U.S. Pat. No. 4,155,582 by Reisner, entitled "Handle accessory for work tools"; U.S. Pat. No. 4,264,096 by Barnett, entitled "Two handled freely pivotable scoop"; U.S. Pat. No. 4,280,727 by Germain, entitled "Injection molded snow shovel"; U.S. Pat. No. 4,615,553 by Hultine, entitled "Auxiliary shovel handle"; U.S. Pat. No. 4,704,758 by Hoffman, entitled "Handle construction for long handled implements"; U.S. Pat. No. 4,958,407 by Johnson, entitled "Auxiliary tool handle"; U.S. Pat. No. 5,522,629 by Loo, entitled "Reversible rake and shovel implement"; U.S. Pat. No. 5,533,768 by Mitchell, entitled "Ergonomic shovel"; U.S. Pat. No. 5,771,535 by Blessing, entitled "Lawn and garden handle"; U.S. Pat. No. 6,601,887 by Graves, entitled "Leverage enhancement arrangement for tool"; U.S. Pat. No. 6,830,271 by Piscopo et al, entitled "Two-handled shovel"; U.S. Pat. No. 8,381,358 by Frey, entitled "Universal handle"; U.S. Pat. No. 9,643,311 by Cowie, entitled "Octagonal extension handle"; U.S. Pat. No. 10,161,092 by Lovell, entitled "Rotating and or extending hand driven tool and associated systems and methods"; 2005/0153606 by Lane et al, entitled "Means and apparatus for ergonomic water paddle with dynamic rotating grip"; Des 401,833 by Whitehead et al, entitled "Handgrip for a child's snow shovel"; Des 580,732 by Meagher et al, entitled "Handle assembly"; and Des 825,295 by Roberts, entitled "Shovel".

Other U.S. patents that illustrate a wide and diverse but non-limiting collection of exemplary hand grips, most which may be incorporated as alternative grip structures within the present invention as will become apparent herein below, the teachings which are incorporated herein by reference, include: U.S. Pat. No. 61,784 by Wheat, entitled "Snow-shovel"; U.S. Pat. No. 157,634 by Reagan, entitled "Handles for saws"; U.S. Pat. No. 184,918 by Siddall, entitled "Hand-protectors for broom-handles"; U.S. Pat. No. 239,126 by Wagner, entitled "Tip for broom handles"; U.S. Pat. No. 245,542 by Moran, entitled "Handle for velocipedes"; U.S. Pat. No. 264,527 by Haley, entitled "Rubber handle"; U.S. Pat. No. 264,798 by Tyler, entitled "Rubber covered handle"; U.S. Pat. No. 296,879 by Scollay, entitled "Balance tip for brooms"; U.S. Pat. No. 309,437 by Calef, entitled "Spoon"; U.S. Pat. No. 347,054 by Morse, entitled "Handle for bicycles"; U.S. Pat. No. 407,571 by Calef, entitled "Knife for cutting corn, etc."; U.S. Pat. No. 479,661 by Poulson, entitled "Spade"; U.S. Pat. No. 581,260 by Biddle, entitled "Hand rest for bicycle handle bars"; U.S. Pat. No. 606,534 by Gifford, entitled "Snow Shovel"; U.S. Pat. No. 615,793 by Bowman, entitled "Hand grip for bicycle handle bars"; U.S. Pat. No. 661,253 by Zimmerman, entitled "Can opening key"; U.S. Pat. No. 693,100 by Bell, entitled "Duster for cleaning walls, etc."; U.S. Pat. No. 712,843 by Paul, entitled "Pneumatic sugar cane cutter"; U.S. Pat. No. 781,772 by Gifford, entitled "Snow Shovel"; U.S. Pat. No. 930,660 by Gifford, entitled "Snow Shovel"; U.S. Pat. No. 969,528 by Disbrow, entitled "Butter spade"; U.S. Pat. No. 1,200,925 by Delamere et al, entitled "Tooth brush and holder"; U.S. Pat. No. 1,443,596 by Schaefer, entitled "Cushion attachment for handles"; U.S. Pat. No. 1,482,858 by Nigh et al, entitled "Handle-bar grip for motor cycles"; U.S. Pat. No. 1,503,251 by Schoof, entitled "Implement handle"; U.S. Pat. No. 1,529,835 by Hamilton, entitled "Handle construction"; U.S. Pat. No. 1,609,414 by Lenny, entitled "Brush"; U.S. Pat. No. 1,644,881 by Hokanson, entitled "Shovel"; U.S. Pat. No. 1,648,354 by Lied, entitled "Golf club"; U.S. Pat. No. 1,776,434 by Hokanson, entitled "Hollow-back shovel"; U.S. Pat. No. 1,790,466 by Gordon, entitled "Window cleaning device"; U.S. Pat. No. 1,851,426 by Haskell, entitled "Tool handle"; U.S. Pat. No. 1,858,380 by Stoddard, entitled "File handle"; U.S. Pat. No. 1,877,125 by Evans, entitled "Mop handle structure"; U.S. Pat. No. 2,070,768 by Wright, entitled "Mixer"; U.S. Pat. No. 2,116,928 by Hanneman, entitled "Gripping implement"; U.S. Pat. No. 2,279,324 by Julien, entitled "Spade or shovel"; U.S. Pat. No. 2,567,565 by Keeler et al, entitled "Handle"; U.S. Pat. No. 2,699,353 by Nagy et al, entitled "Pistol grip doorknob"; U.S. Pat. No. 2,737,060 by Russell, entitled "Steering devices"; U.S. Pat. No. 2,951,482 by Sullivan, entitled "Surgical saw"; U.S. Pat. No. 3,014,750 by Briggs, entitled "Easy hold shovel handle"; U.S. Pat. No. 3,024,031 by Davidson, entitled "Tool handle adapter socket"; U.S. Pat. No. 3,155,414 by Bales, entitled "Handle"; U.S. Pat. No. 3,222,699 by Zeisig, entitled "Snow shovel with handle mounted ice chopper"; U.S. Pat. No. 3,226,149 by McJohnson, entitled "Spade, shovel and spading fork"; U.S. Pat. No. 3,268,968 by Crickmer, entitled "Slip handle"; U.S. Pat. No. 3,372,509 by Arsenault, entitled "Fishing rod handling device"; U.S. Pat. No. 3,372,510 by Arsenault, entitled "Fishing rod handling device"; U.S. Pat. No. 3,549,189 by Alosi, entitled "Tool handle"; U.S. Pat. No. 3,751,804 by Pulrang, entitled "Deburring tool"; U.S. Pat. No. 3,949,817 by Rice, entitled "Chain saw extender"; U.S. Pat. No. 4,128,266 by Vaslas, entitled "Auxiliary handle for long-handled implements"; U.S. Pat. No. 4,129,327 by Moore, entitled "Shovel"; U.S. Pat. No. 4,147,348 by Lee, entitled "Tennis racket providing increased hitting power"; U.S. Pat.

No. 4,155,582 by Reisner, entitled "Handle accessory for work tools"; U.S. Pat. No. 4,155,582 by Reisner, entitled "Handle accessory for work tools"; U.S. Pat. No. 4,197,764 by Auernhammer, entitled "Detachable handle assembly"; U.S. Pat. No. 4,263,690 by Dobosi, entitled "Paint roller tool with hand grip"; U.S. Pat. No. 4,378,718 by Kraft et al, entitled "Handle for pivotable machine parts"; U.S. Pat. No. 4,495,669 by Hooper, entitled "Dual-grip handle brush for painting and the like"; U.S. Pat. No. 4,537,433 by Yang, entitled "Auxiliary handle for a shovel"; U.S. Pat. No. 4,548,092 by Strong, Jr, entitled "Bicycle gear shift unit"; U.S. Pat. No. 4,690,447 by Adams, entitled "Raised grip shovel"; U.S. Pat. No. 4,730,632 by Mace, entitled "Cane with handle featuring gripping aids"; U.S. Pat. No. 4,930,181 by Johnson, entitled "Auxiliary tool handle"; U.S. Pat. No. 4,951,956 by Vittone, entitled "Hand grip for a wheelbarrow"; 4,958,407 by Johnson, entitled "Auxiliary tool handle"; U.S. Pat. No. 5,133,101 by Hauser et al, entitled "Handle for a mop"; U.S. Pat. No. 5,133,582 by Rocha, entitled "Two-handed shovel"; U.S. Pat. No. 5,145,210 by Lennon, entitled "Bicycle, handlebar and adapter system"; U.S. Pat. No. 5,451,085 by Wagner, entitled "Tool handle holder"; U.S. Pat. No. 5,496,085 by Middleton, entitled "Auxiliary handle unit for long handled hand tools"; U.S. Pat. No. 5,529,357 by Hoffman, entitled "Leverage enhancing assembly"; U.S. Pat. No. 5,544,935 by Cone et al, entitled "Carrier apparatus"; U.S. Pat. No. 5,581,915 by Lobato, entitled "Snowplow carriage assembly for manual snow removal"; U.S. Pat. No. 5,595,532 by McCracken, entitled "Electrically-powered polisher"; U.S. Pat. No. 5,606,772 by Ilic, entitled "Ergonomic handle grip for tools"; U.S. Pat. No. 5,651,581 by Myers et al, entitled "Infant seat handle"; U.S. Pat. No. 5,695,231 by Hoffman, entitled "Leverage enhancing grip assembly"; U.S. Pat. No. 5,771,535 by Blessing, entitled "Lawn and garden handle"; U.S. Pat. No. 5,787,588 by Tisbo et al, entitled "Ice chipper"; U.S. Pat. No. 5,799,996 by Fredrickson, entitled "Multi-function hand tool"; U.S. Pat. No. 5,802,960 by Graj et al, entitled "Ergonomic cookware"; U.S. Pat. No. 5,813,206 by McKittrick, entitled "Garden tool having enhanced leverage"; U.S. Pat. No. 5,830,047 by McCracken, entitled "Electrically-powered polisher"; U.S. Pat. No. 5,926,895 by Roy, entitled "Vacuum cleaner hose cleaning brush"; U.S. Pat. No. 5,937,627 by McKittrick, entitled "Gardening implement having enhanced leverage"; U.S. Pat. No. 5,979,005 by Lecce, entitled "Toothbrush apparatus"; U.S. Pat. No. 6,101,657 by Hamilton, entitled "Applicator having an extension"; U.S. Pat. No. 6,101,909 by Djie, entitled "Rotary tool"; U.S. Pat. No. 6,122,792 by Roy, entitled "Tube and hose cleaning brush"; U.S. Pat. No. 6,168,507 by McCracken, entitled "Electrically-powered polisher"; U.S. Pat. No. 6,199,245 by Blessing, entitled "Multi-component lawn and garden handle"; U.S. Pat. No. 6,203,081 by Kegan, entitled "Easy lift levered shovel"; U.S. Pat. No. 6,343,822 by Badura, entitled "Pivoting shovel handle"; U.S. Pat. No. 6,434,793 by Ensson, entitled "Device arranged at the end of a handle"; U.S. Pat. No. 6,460,911 by Engelsiepen, entitled "Ditch scooping device"; U.S. Pat. No. 6,564,426 by Wang, entitled "Retractable handle assembly having rotatable hand grip"; U.S. Pat. No. 6,725,491 by Hung, entitled "Car waxing machine with driving handle"; U.S. Pat. No. 6,798,348 by Wilker et al, entitled "Ergonomically designed tool handle"; U.S. Pat. No. 6,814,156 by Dieterle et al, entitled "Hand guided electrical tool with an auxiliary handle"; U.S. Pat. No. 6,871,377 by Veltrop et al, entitled "Grill scraper"; U.S. Pat. No. 7,032,942 by Stuart, entitled "Extensible grip stand-up shovel"; U.S. Pat. No. 7,350,839 by Marquardt et al, entitled "Hand tool"; U.S. Pat. No. 7,396,187 by Meyers, entitled "Upright trowel"; U.S. Pat. No. 7,398,579 by Moshenrose, entitled "Ergonomic appliance handle"; U.S. Pat. No. 7,637,882 by Carman et al, entitled "Multiple use handle support for distributing forces"; U.S. Pat. No. 7,836,557 by Baker, entitled "Ergonomic garden trowel"; U.S. Pat. No. 8,006,351 by Baker, entitled "Short-handled, ergonomic garden tools"; U.S. Pat. No. 8,065,774 by Schiesz et al, entitled "Paint brush with detachable head"; U.S. Pat. No. 8,108,966 by Viviano, entitled "Vacuum acoustic ceiling removal system"; U.S. Pat. No. 8,152,396 by Kuykendall, entitled "Function first grip"; U.S. Pat. No. 8,381,358 by Frey, entitled "Universal handle"; U.S. Pat. No. 8,387,263 by Roberts, entitled "Easy use utensil"; U.S. Pat. No. 8,640,295 by Schiesz et al, entitled "Paint brush with detachable head"; U.S. Pat. No. 8,683,896 by Gerbec et al, entitled "Ergonomic surgical instrument handle"; U.S. Pat. No. 8,714,607 by Suber, entitled "Hand shovel assembly"; U.S. Pat. No. 8,740,272 by Walden et al, entitled "Ergonomically designed multi-handled tool"; U.S. Pat. No. 8,740,272 by Walden et al, entitled "Ergonomically designed multi-handled tool"; U.S. Pat. No. 8,776,648 by Lee, entitled "Ergonomic tool handle enhancement"; U.S. Pat. No. 8,832,898 by Stimach, entitled "Two-handed scraping device"; U.S. Pat. No. 9,163,372 by Elston, entitled "Three handled snow shovel"; U.S. Pat. No. 9,498,877 by Henry, entitled "Shovel with two integral handles and exterior handle"; U.S. Pat. No. 9,889,550 by McNeny et al, entitled "Step down handle for a hand tool"; Des 170,892 by Schoenwald, entitled "Combined holder and handle for electric soldering irons and the like"; Des 215,081 by Zagwyn, entitled "Golf cart handle grip"; Des 240,678 by Herig, entitled "Handle for paint rollers and brushes"; Des 251,566 by Moen, entitled "Adjustable handle"; Des 300,713 by Trapasso, entitled "Arm-attached tree climbing tool"; Des 31,050 by De Witt, entitled "Grip for handle bars"; Des 334,525 by Adams, entitled "Handle for a fireplace tool"; Des 339,731 by Stewart, entitled "Tool handle"; Des 339,732 by Stewart, entitled "Tool handle"; Des 360,123 by Shu, entitled "Handle for a tool"; Des 373,944 by Thompson et al, entitled "Screwdriver handle"; Des 377,300 by Fredrick von Essen, entitled "Two-handled shovel"; Des 387,263 by Bidstrup et al, entitled "Tool handle"; Des 388,684 by Irwin, entitled "Hand grip"; Des 396,624 by Basilius, entitled "Handle grip"; Des 401,833 by Whitehead et al, entitled "Handgrip for a child's snow shovel"; Des 418,734 by Ritrovato et al, entitled "Pair of handle grips"; Des 432,891 by Sterling, entitled "Tool handle"; Des 459,642 by Haquin, entitled "Scissors handle rings"; Des 466,389 by Clivio, entitled "Handle for a garden tool"; Des 468,618 by Ho, entitled "Handle of a hand tool"; Des 487,010 by Marquardt et al, entitled "Handle for a hand tool"; Des 493,685 by Dallas, entitled "Tool handle"; Des 528,398 by Meyer et al, entitled "Edger handle"; Des 544,330 by Hurley, entitled "Three lobed handle for tools"; Des 611,321 by Boies et al, entitled "Circular grip"; Des 627,619 by Demers et al, entitled "Tool handle"; Des 668,128 by Masalin et al, entitled "Handle for cutting tool"; Des 676,723 by Norwood et al, entitled "Two handled shovel"; Des 686,477 by Pookrum, entitled "Scissor handles"; Des 690,183 by Lee, entitled "Ergonomic tool handle"; Des 697,783 by Chesner, entitled "Ergonomic handgrip"; Des 706,594 by Workman et al, entitled "Shovel handle"; and Des 716,119 by Elston, entitled "Shovel".

In addition to the foregoing patents, Webster's New Universal Unabridged Dictionary, Second Edition copyright 1983, is incorporated herein by reference in entirety for the definitions of words and terms used herein.

To more readily ship and store a shovel, rake, or other hand tool or implement, the handle must be shortened. As discussed herein above, a segmented handle takes care of the shipping problem and may provide improved ergonomics, but prior solutions result in a more flimsy and less reliable tool. As may be apparent, in spite of the enormous advancements over many years, and the substantial research and development that has been conducted by highly skilled artisans, there still remains a need for a hand tool or implement handle that is simultaneously very ergonomic, durable, reliable, and which requires minimal space to ship and store.

SUMMARY OF THE INVENTION

Exemplary embodiments of the present invention solve inadequacies of the prior art and provide a more ergonomic handle for shovels, rakes and other yard implements by providing handle segments that are end mounted into an intermediate offset connector body, with each segment parallel but transversely and longitudinally offset from the other so that the handles are adjacent and overlapping for at least a short distance. A fastener extends through the offset connector body into the handle segments, with the fastener longitudinal axis running parallel to the handle segment longitudinal axis. In addition, the handle segments are either not round, to prevent the handle segments from rotating or twisting in the offset connector body, or in alternative embodiments are provided with anti-rotational features. Other benefit from these changes include the ability to pack the handle, offset connector body, secondary and tertiary handles if so provided, and implement parts in a single compact box that is shipped using conventional shippers such as the United States Post Office, Fed-Ex, or UPS without the significant extra fees required for oversize boxes.

In a first manifestation, the invention is a parallel offset handle connector. The handle connector has two end plates, each having a handle retention pass through. At least one spacer is adjacent to and connects the end plates. Two offset and overlapping handles are each retained by a handle pass through which aligns the handles parallel to one another. At least two attachment openings are formed in at least one of the at least one spacer and the two end plates. A first one of the two offset and overlapping handles is attached through a first one of the at least two attachment openings. A second one of the two offset and overlapping handles is attached through a second one of the at least two attachment openings.

In a second manifestation, the invention is a hand implement, having a primary hand grip; an implement head distal to the primary hand grip; and a parallel offset handle connector intermediate between the primary hand grip and the implement head. The parallel offset handle connector has two end plates, each having a handle retention pass through. At least one spacer is adjacent to and connects the end plates. Two offset and overlapping handles are each retained by a handle pass through which aligns the handles parallel to one another. At least two attachment openings are formed in at least one of the at least one spacer and the two end plates. A first one of the two offset and overlapping handles is attached through a first one of the at least two attachment openings. A second one of the two offset and overlapping handles is attached through a second one of the at least two attachment openings.

OBJECTS OF THE INVENTION

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to a tool or implement handle that is simultaneously very ergonomic, durable, reliable, cost-effective, and which requires minimal space to ship and store. A second object of the invention is to provide a non-rotational tool and implement handle that is easily subdivided for compact shipping and storage. Another object of the present invention is to provide a non-rotational tool and implement handle that is easily and intuitively assembled by an end user, and which enables the end user customize a variety of features, for exemplary and non-limiting purpose including the length of each handle segment, and the types and orientation of handle grips. A further object of the invention is to allow a person to adjust the tool or implement handle during or between use, to accommodate instantaneous needs or requirements. Yet another object of the present invention is to provide a tool or implement handle that fulfills the aforementioned objectives while facilitate A/B two part mold formation of an implement or tool handle offset connector.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 20 illustrates a first alternative embodiment scraper implement having offset connector and secondary grip in combination with a pair of handle segments, scraper shovel blade, and primary terminating handle grip designed in accord with the teachings of the present invention from a projected view.

FIG. 30 illustrates a sixth alternative embodiment offset connector and secondary grip, designed in accord with the teachings of the present invention from a projected view.

DESCRIPTION OF THE PREFERRED EMBODIMENT

Figure 1:
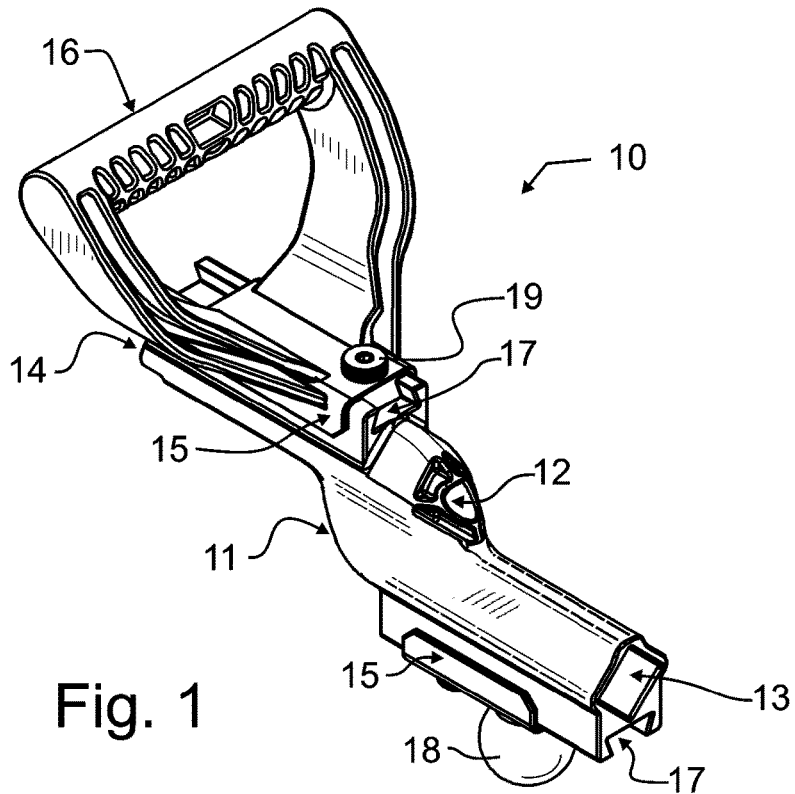
FIG. 1 illustrates a first preferred embodiment offset connector, secondary D-grip, and tertiary ball grip, designed in accord with the teachings of the present invention from a projected view.
Figure 2:
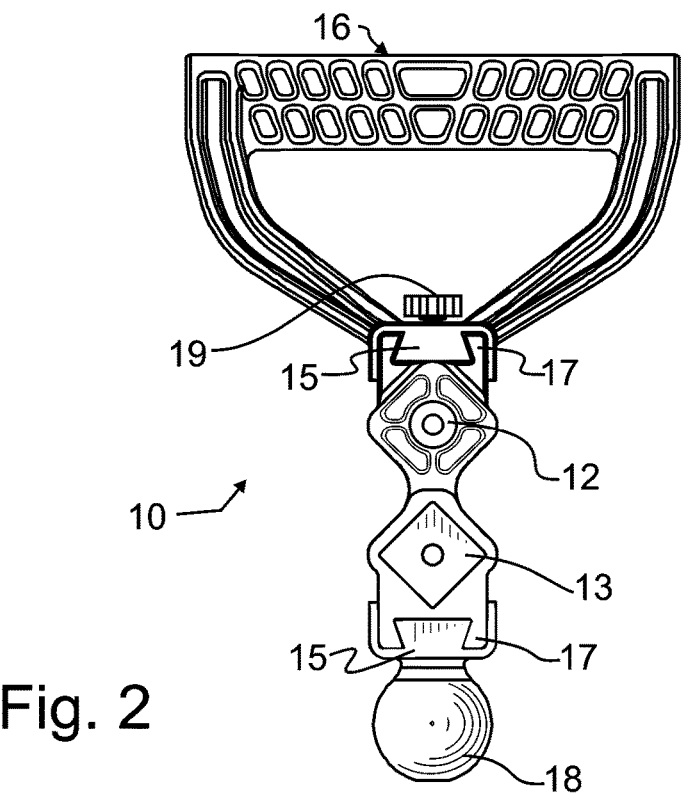
FIGS. 2-6 illustrate the first preferred embodiment offset connector with secondary and tertiary grips of FIG. 1 from front elevational, rear elevational, side elevational, bottom, and top views, respectively.
Figure 3:
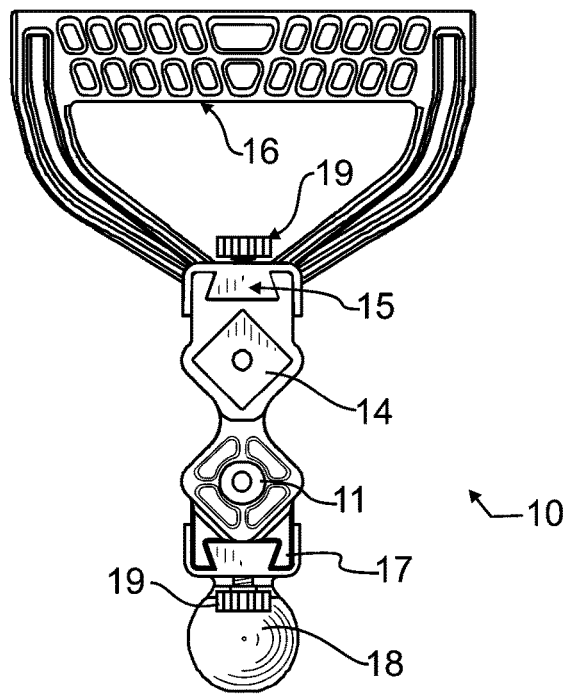
Figure 4:
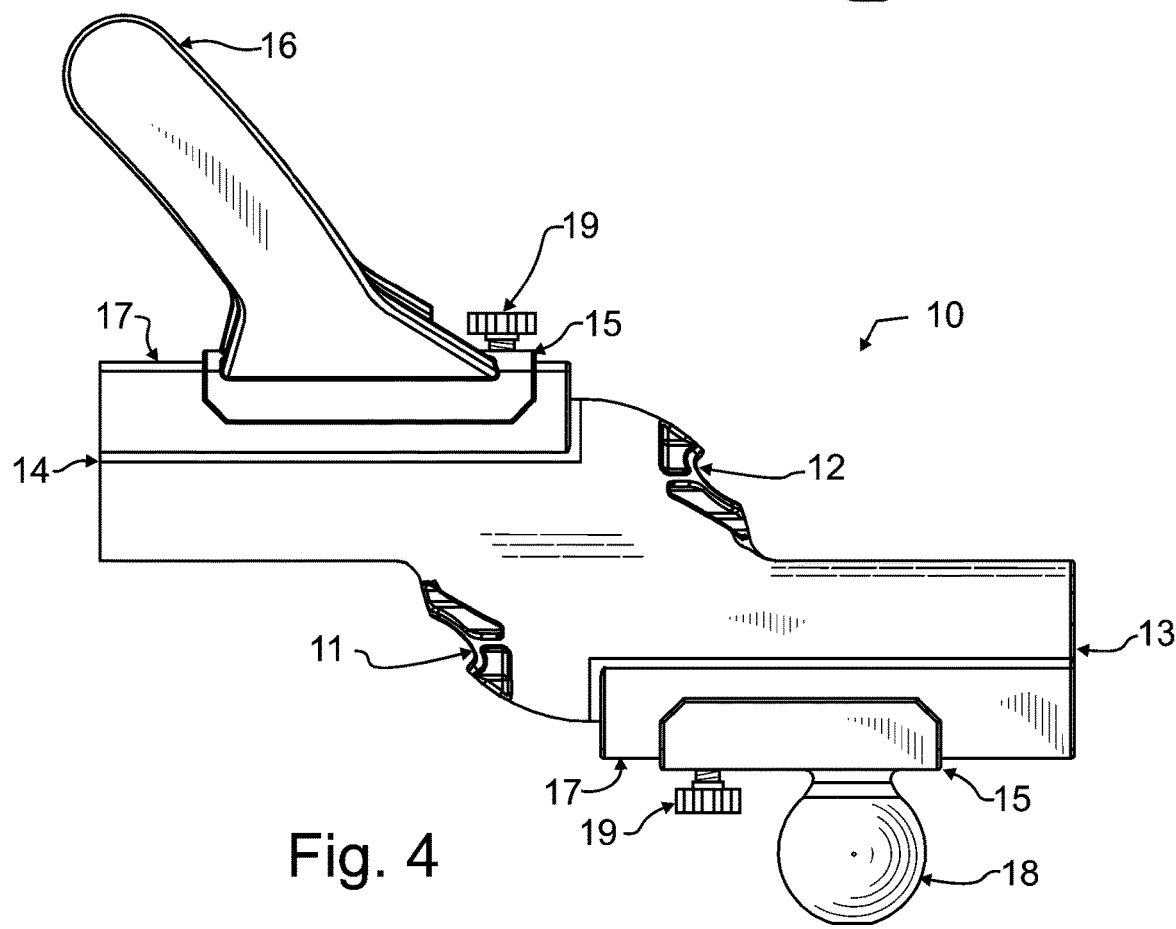
Figure 5:
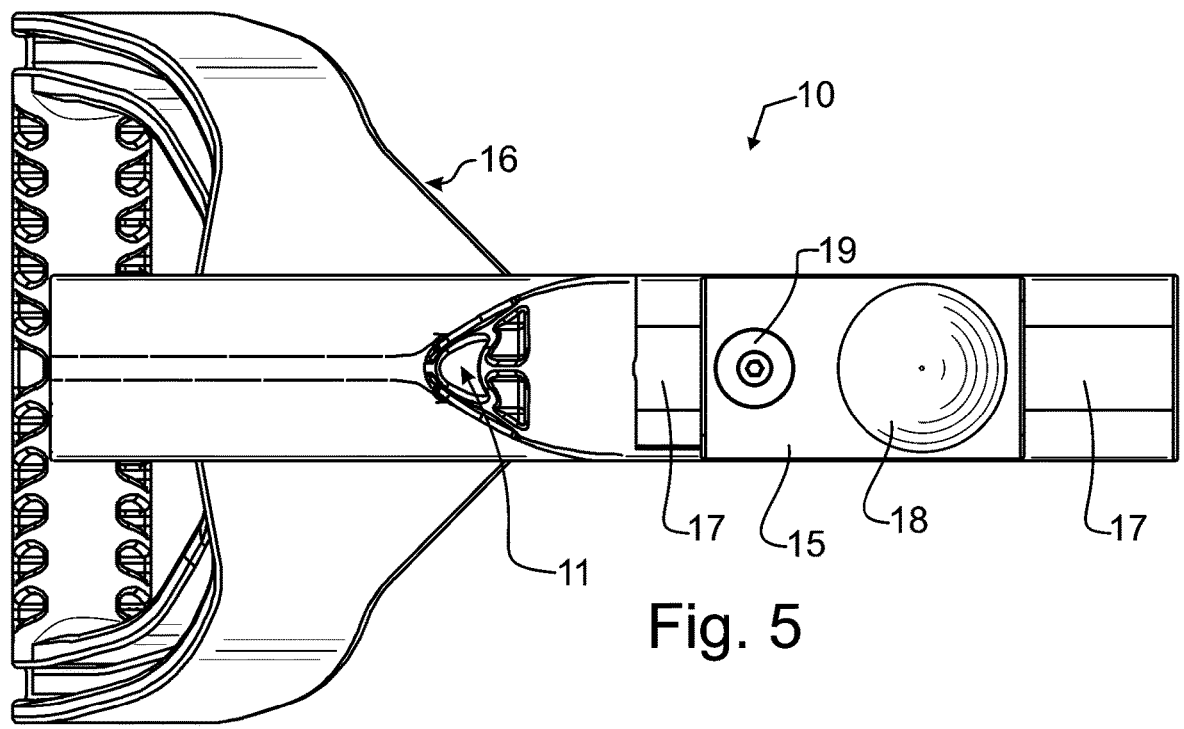
Figure 6:
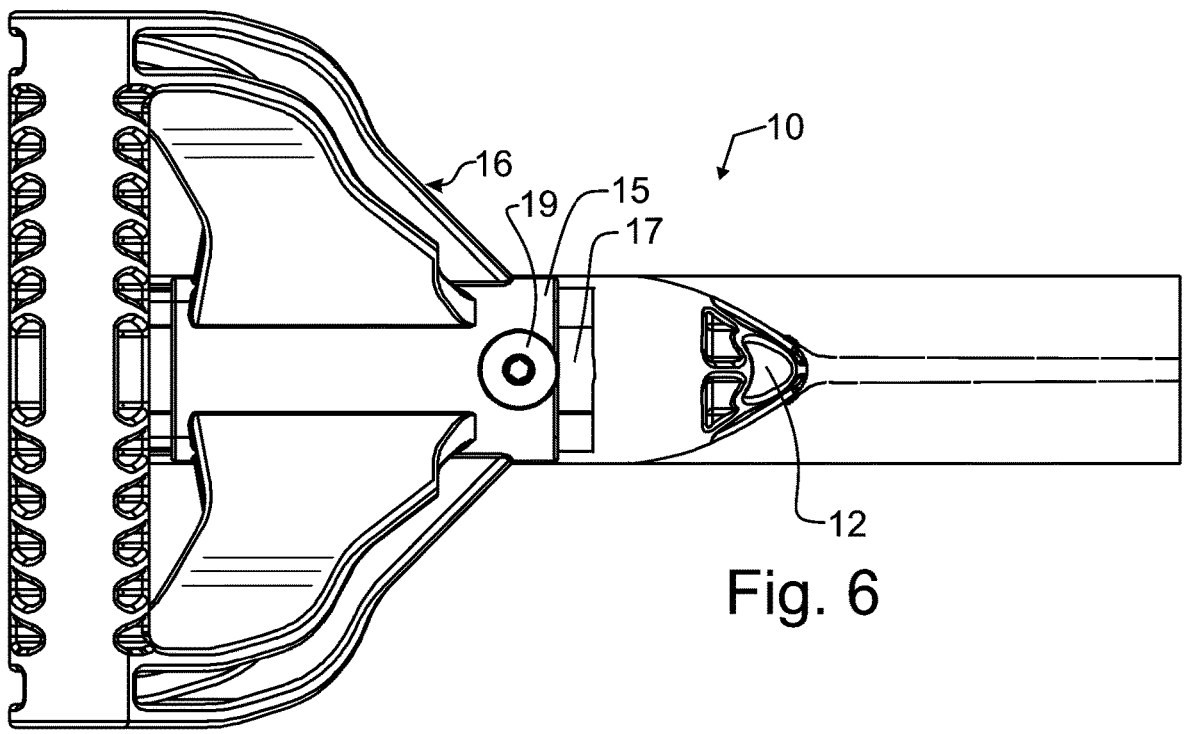

Manifested in the preferred embodiments, the present invention provides an offset connector that subdivides a long, slender tool or implement handle. The offset connector may be provided with one or more unitary or replaceable grips. The additional grips serve as secondary or tertiary hand holds that enable more adaptable and capable ergonomic manipulation of the tool or implement. The offset connector is inserted intermediate between a primary handle grip and the tool or implement head, thereby subdividing the long slender tool or implement handle into two separate handle segments. Each handle segment is inserted into a handle segment receiver socket, and is affixed therein using a bolt or screw that is longitudinally co-axial with the longitudinal axis of the handle segment.

In a first preferred embodiment of the invention illustrated in FIGS. 1-6, an offset connector 10 is comprised of two longitudinally parallel, laterally offset, and partially longitudinally overlapping handle segment receiver sockets 13 and 14. Two slightly recessed opposed end plate screw openings 11 and 12 pass into the handle segment receiver sockets 13 and 14, respectively. Two sliding dovetail sockets 17 act as receivers for two sliding dovetail tail grip carriers 15. Grip carriers 15 are configured to slide within the two sliding dovetail sockets 17. One of the two sliding dovetail tail grip carriers 15 is provided with an optional secondary D-grip 16, and the other is provided with an optional tertiary ball grip 18. D-grip 16 and ball grip 18 are each affixed or integrated into the sliding dovetail tail grip carrier 15 using any suitable technique.

The travel of each individual one of the two sliding dovetail tail grip carriers 15 within the two sliding dovetail sockets 17 may in various embodiments be selectively controlled by any number of means, including but not limited to: thumb screws 19 as illustrated; set screws; piercing screws; adjustment holes and stops; friction fitting; and/or glue. The combination of sliding dovetail tail grip carriers 15 engaged within sliding dovetail sockets 17 allows different secondary and tertiary grips to easily be attached and removed from offset connector 10, and further allows the grips to be selectively positioned through a range of travel within sliding dovetail sockets 17 and along offset connector 10 to suit the needs of a particular person. Where so desired, index holes may be provided in sliding dovetail sockets 17 into which thumb screws 19 and the like may pass.

Various embodiments of offset connectors designed in accord with the present invention have been illustrated in the various figures. The embodiments are distinguished from each other by the hundreds and tens digits wherever reasonably possible, and various components within each offset connector embodiment are designated by the ones digit. However, many of the components are alike or similar between embodiments, so numbering of the ones digit has been maintained wherever possible, such that identical, like or similar functions may more readily be identified between the offset connector embodiments. If not otherwise expressed, those skilled in the art will readily recognize the similarities and understand that in many cases like numbered ones digit components may be substituted from one embodiment to another in accord with the present teachings, except where such substitution would otherwise destroy operation of the embodiment. One notable exception is the references to handle segments 32, 34, which clearly do not correspond with end plate screw connection 12 or handle segment receiver socket 14.

Figure 7:
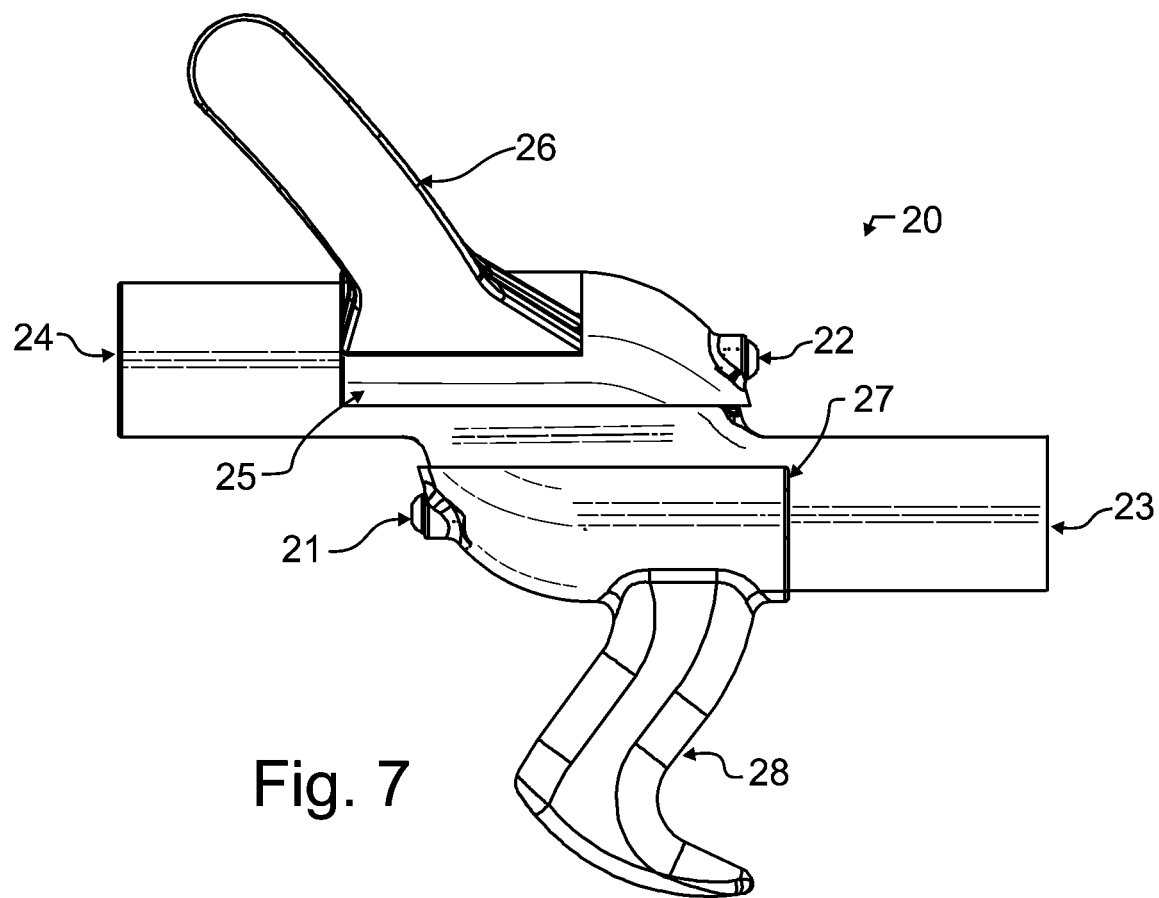
FIGS. 7 and 8 illustrate a second preferred embodiment offset connector with secondary and tertiary grips from side elevational and projected views, respectively.
Figure 8:
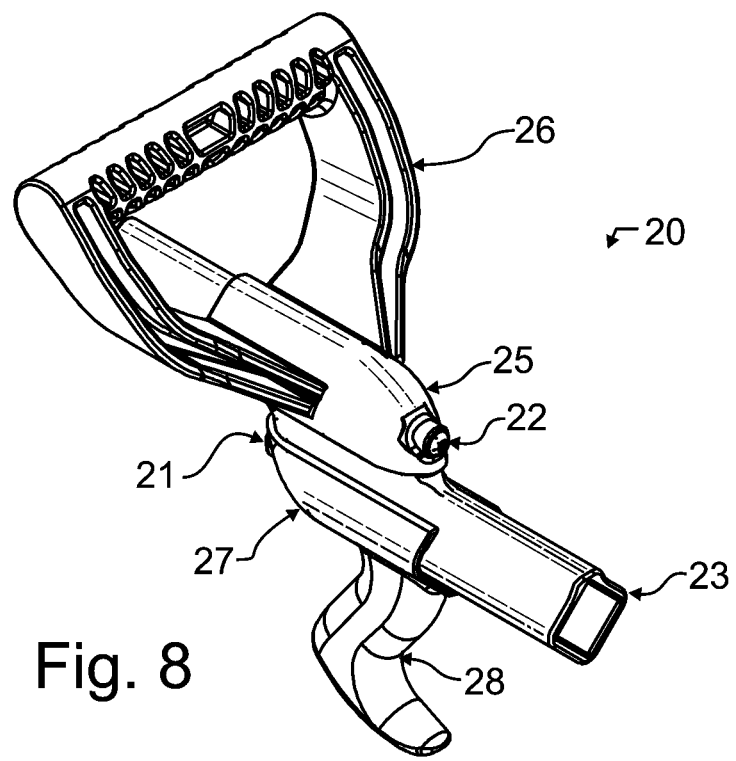

Second preferred embodiment offset connector 20 illustrated in FIGS. 7 and 8 has many features similar to those found in first preferred embodiment offset connector 10, including handle segment receiver sockets 23 and 24 that are very similar in both geometry and function to handle segment receiver sockets 13 and 14. However, end plate screw connections 21 and 22 not only retain handle segments but also function as the selective retaining mechanism for handle 26 and grip 28. The geometries of handle 26 and grip 28 are preferably designed to grip around the edges of handle segment sockets 23, 24 using shaped handle sides 25, 27 to prevent undesirable lifting and torque transfer through end segment sockets 23, 24. In addition, and as will be apparent from a review of the preferred embodiment offset connectors 10, 20, 30, 40, 50, 60, 70, 80, 90, 600, 610, 620, 630, and 640 illustrated herein, the geometry and placement of secondary and tertiary handles such as D-grip 26 and ball grip 28 will be selected by a particular designer to suit desired objectives and appearance.

The best depiction of how first preferred embodiment offset connector 10 functions is inferred from FIGS. 9-12. Those figures depict a third preferred embodiment offset connector similar to first and second preferred embodiment offset connectors 10, 20. Each of the preferred embodiment offset connectors 10, 20, 30, 40, 50, 60, 70, 80 illustrated herein are configured to receive handle segments 32, 34.

These handle segments 32, 34 are inserted into handle segment sockets such as 13 and 14 provided in offset connector 10, and each one of handle segments 32, 34 is secured at an end by screw using the respective end plate screw connections such as 11 and 12. To keep handle segments 32, 34 from spinning, in accord with the teachings of the present invention the handle segments are not round, and in the most preferred embodiment have an exterior cross-section or perimeter that is square. This non-round exterior ensures that the handle segments 32, 34 will engage sockets such as 13, 14, and so will not rotate relative to the socket.

Figure 9:
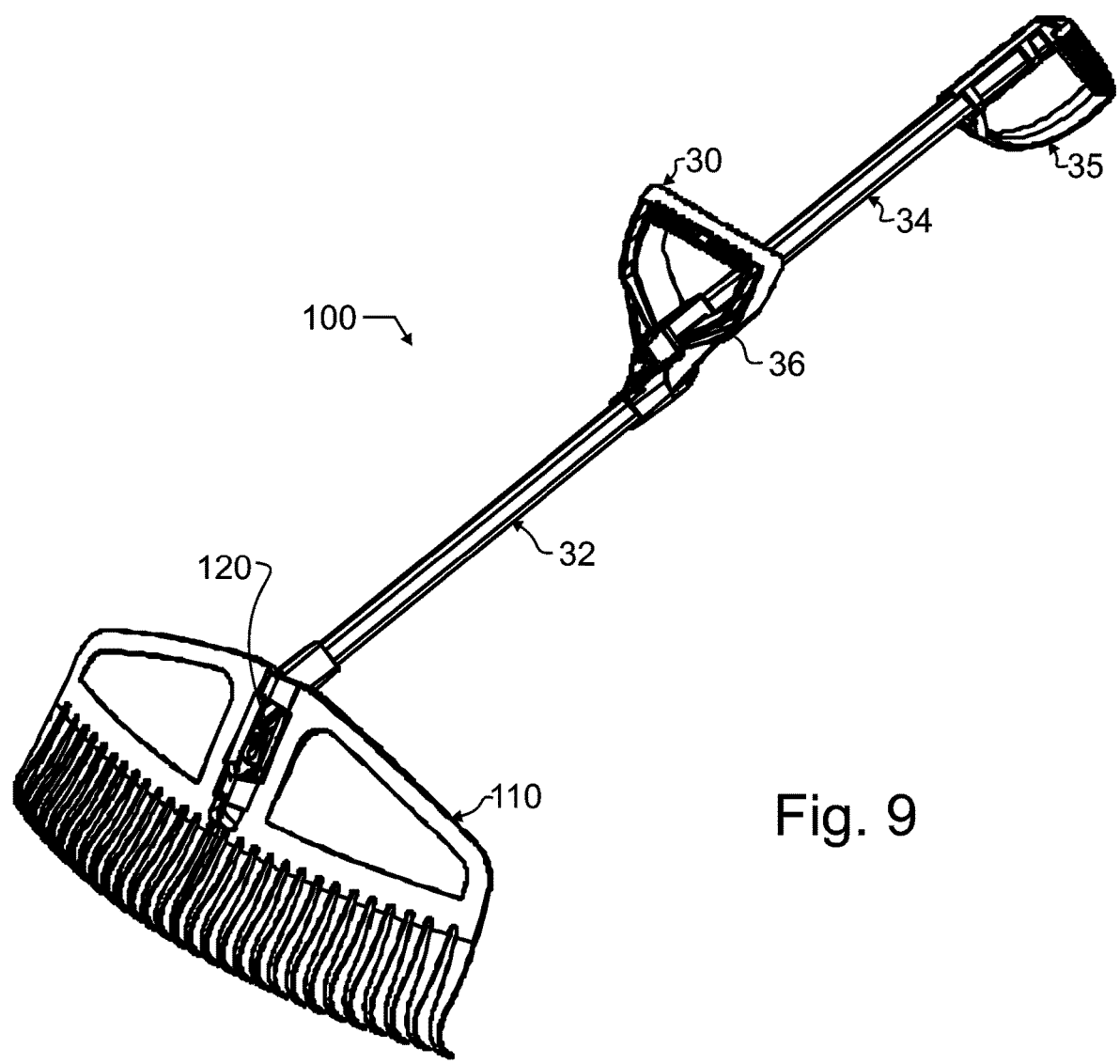
FIG. 9 illustrates a third preferred embodiment offset connector with secondary D-grip in combination with a pair of handle segments, rake head, and primary terminating handle grip, from a projected view.

FIG. 9 depicts a preferred embodiment rake 100, which is comprised of a third preferred embodiment offset connector 30 sharing many of the features of the other preferred embodiment offset connectors. However, in this third preferred embodiment offset connector 30 there is only one secondary handle grip 36 that is molded as an integral and unitary part of offset connector 30. The primary and terminal handle grip 35 most preferably has an end plate screw connection similar to end plate screw connections 11, 12, 21, 22 found on offset connectors 10, 20, and so attaches to handle segment 34 in a like manner. Rake 100 also has a rake head 110. Rake head 110 is most preferably provided with an end plate screw connection 120 which connects rake head 110 to handle segment 32, also in a like manner to end plate screw connections 11, 12, 21, 22 found on offset connectors 10, 20.

In a manner similar to the numbering of the offset connector embodiments, the implement and tool embodiments, which generally combine an offset connector with one or several grips, a pair of handle segments, a tool or implement head, and a primary terminating handle grip, are distinguished by the hundreds digits wherever reasonably possible, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 10:
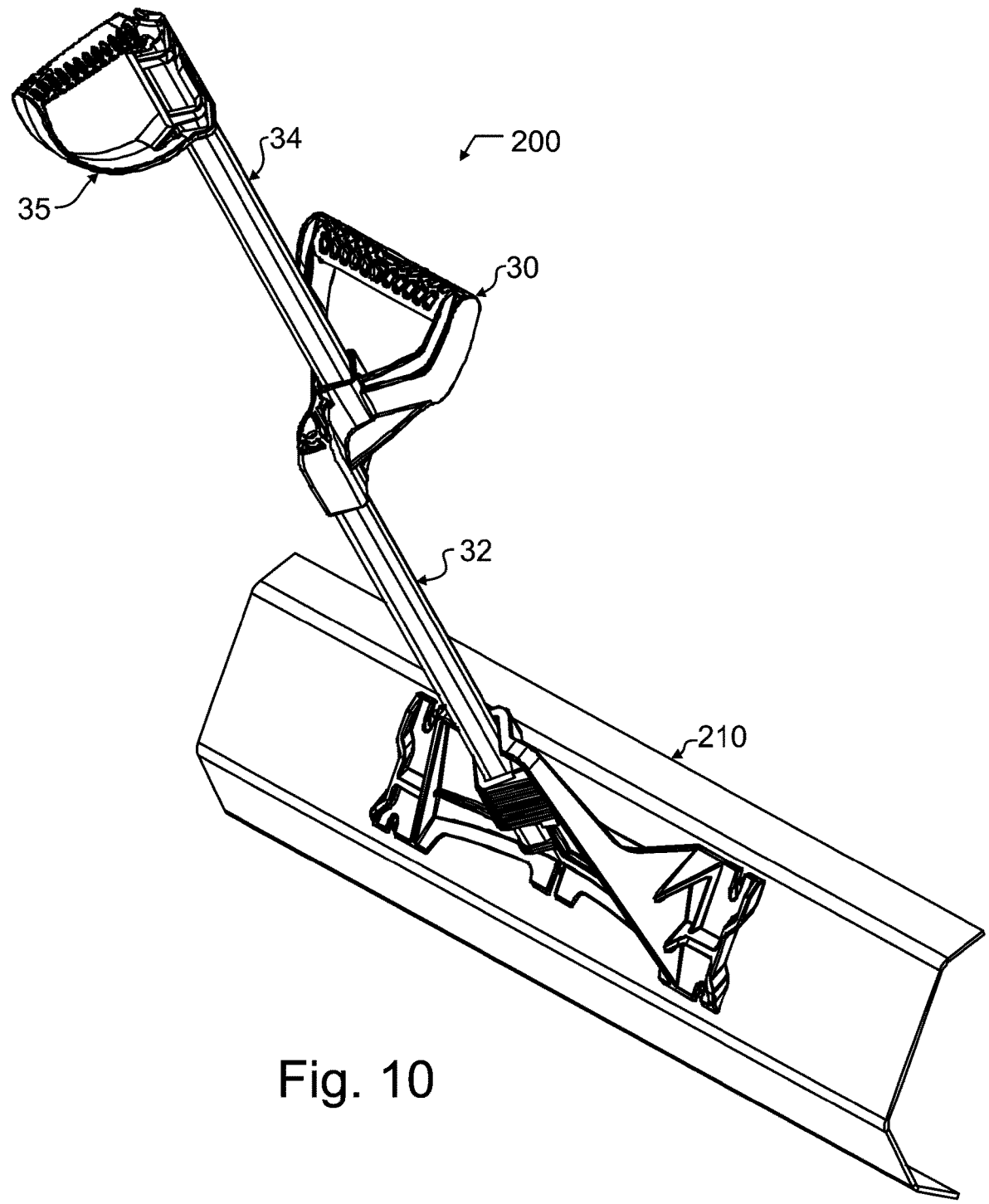
FIG. 10 illustrates the third preferred embodiment offset connector with secondary D-grip of FIG. 9 in further combination with a pair of handle segments, scraper shovel head, and primary terminating handle grip, from a projected view.
Figure 11:
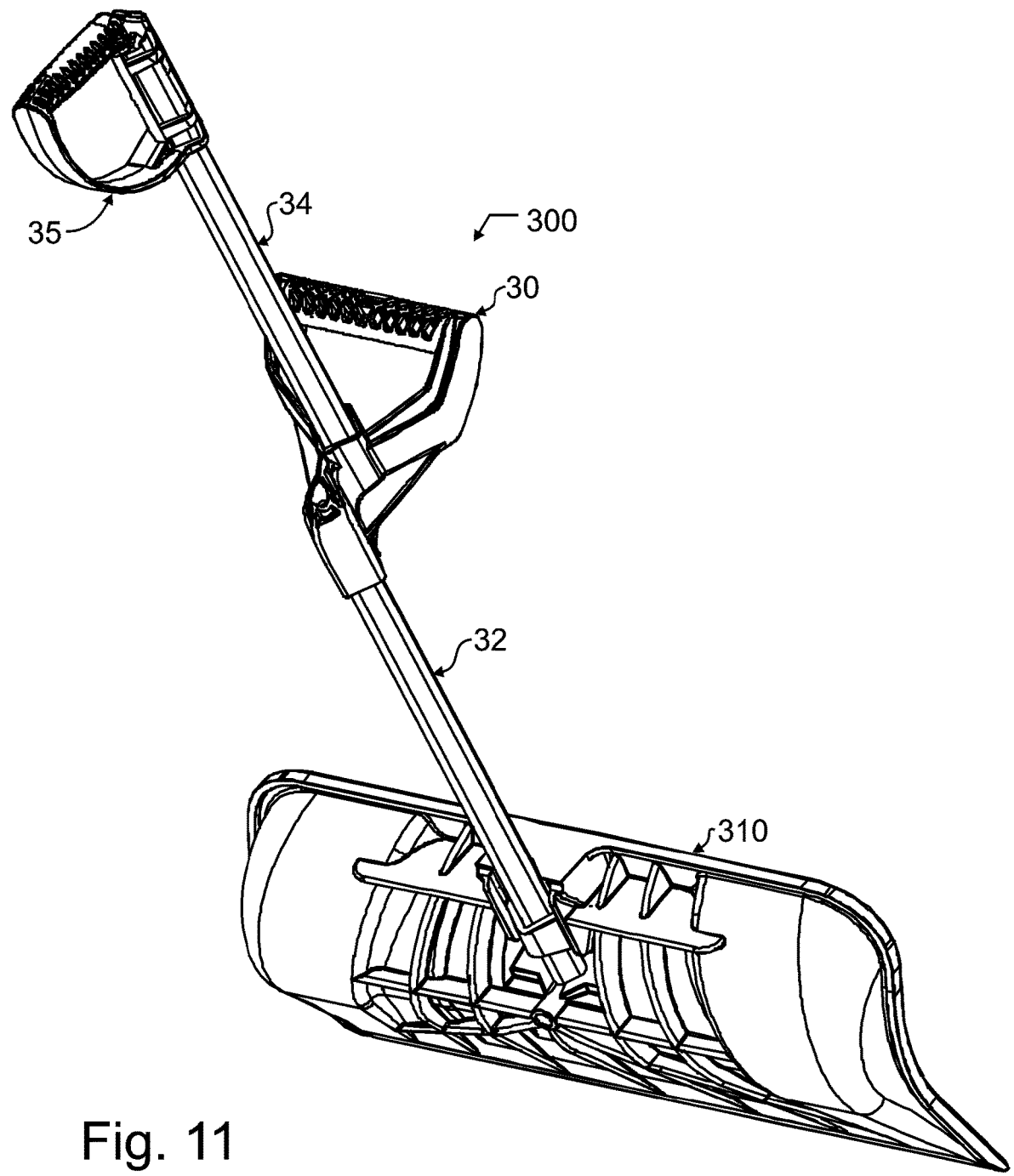
FIG. 11 illustrates the third preferred embodiment offset connector with secondary D-grip of FIG. 9 in further combination with a pair of handle segments, snow shovel, and a primary terminating handle grip, from a projected view.
Figure 12:
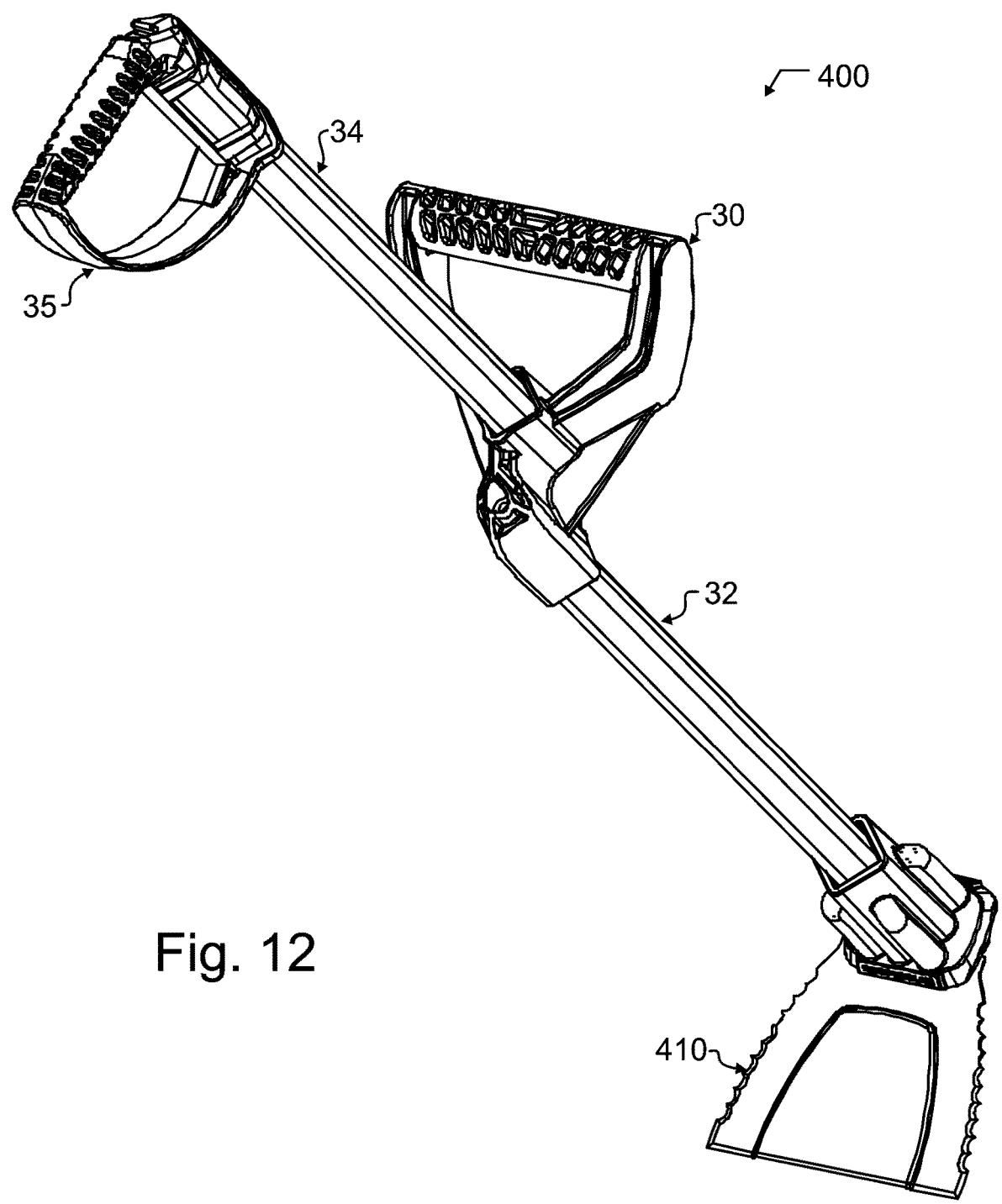
FIG. 12 illustrates the third preferred embodiment offset connector with secondary D-grip of FIG. 9 in further combination with a pair of handle segments, a hoe-style hand implement, and a primary terminating handle grip, from a projected view.
Figure 13:
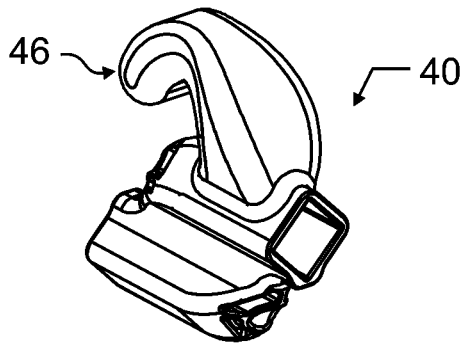
FIGS. 13-17 illustrate fourth, fifth, sixth, seventh, and eighth preferred embodiment offset connectors with secondary grip, each from a projected view.
Figure 14:
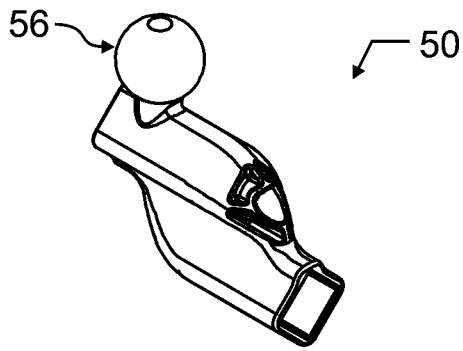
Figure 15:
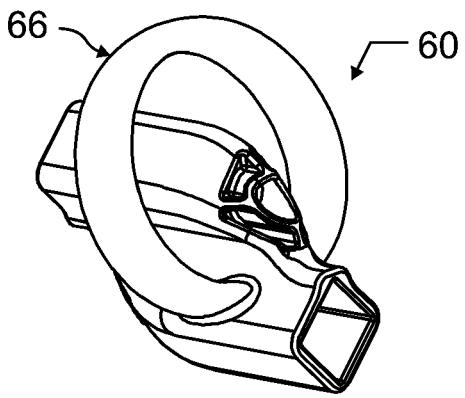
Figure 16:
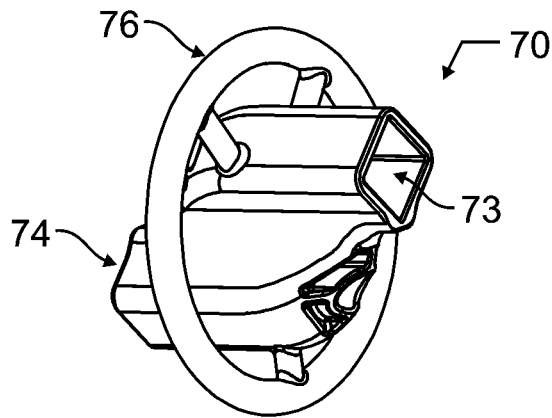
Figure 17:
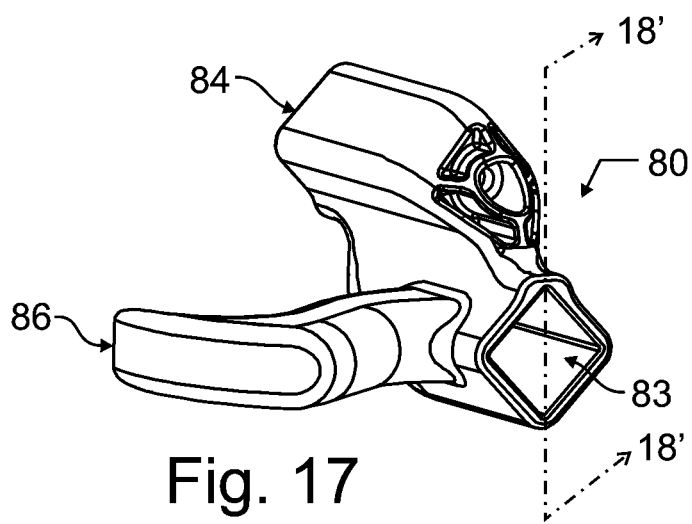

FIGS. 10-12 depict exemplary alternative embodiment tools and implements with a construction similar to rake 100 illustrated in FIG. 9, each incorporating the third preferred embodiment offset connector 30, but with different head attachments. FIG. 10 depicts a scraper shovel 200 with a scraper shovel blade 210. FIG. 11 depicts a snow shovel 300 with snow shovel head 310. FIG. 12 depicts a specialized hoe 400 with a specialized hoe blade 410. The scraper shovel blade 210, snow shovel head 310, and specialized hoe blade 410 all have end plate connections that attach them to handle segment 34, and geometries designed to transfer the stress of use of the various implements along handle 34 so that they are durable and are not damaged in normal use.

FIGS. 13-17 each depict additional preferred embodiment offset connectors 40, 50, 60, 70, and 80 that, like the third preferred embodiment offset connector 30, have an integrated or unitary secondary grip. Fourth preferred embodiment offset connector 40 has an ergonomic grip 46. Fifth preferred embodiment offset connector 50 has a ball grip 56. Sixth preferred embodiment offset connector 60 has a half circle grip 66. Seventh preferred embodiment offset connector 70 has a full circle grip 76 that entirely circumscribes the remainder of offset connector 70, including circumscribing both handle segment receiver sockets 73, 74. Eighth preferred embodiment offset connector 80 has a side grip 86.

Figure 18:
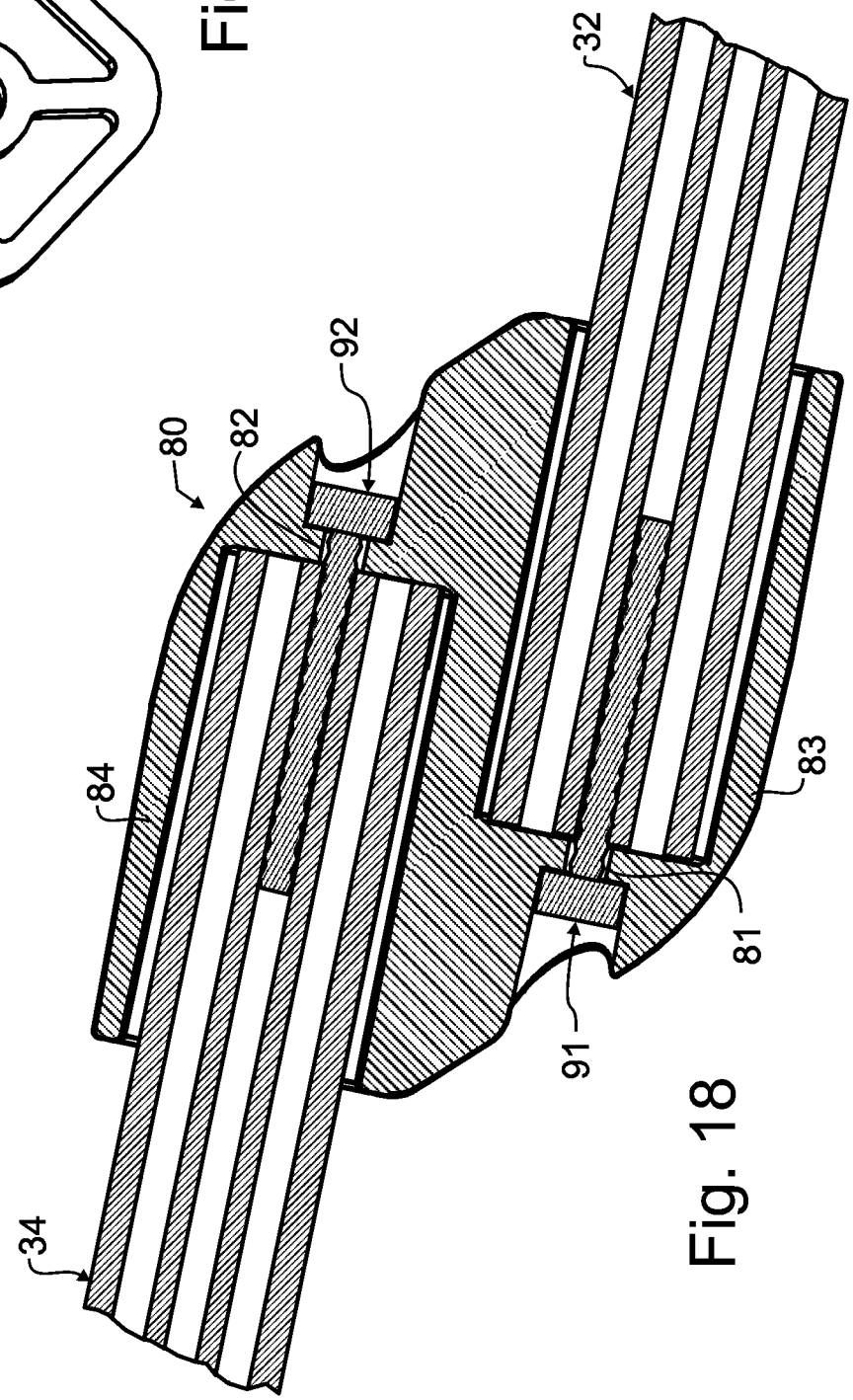
FIG. 18 illustrates the eighth preferred embodiment offset connector of FIG. 17 from a central vertical plane sectional view.

FIG. 18 depicts the eighth preferred embodiment offset connector 80 sectioned using a vertical plane approximately centrally through handle segment receiver sockets 83, 84 to reveal end screws 91, 92 passing through end plate screw connections 81, 82, respectively, and connecting offset connector 80 to handle segments 32, 34.

As may be appreciated, the preferred embodiment offset connectors 10, 20, 30, 40, 50, 60, 70, 80 can be made of any material, but most preferably are made from a thermoplastic capable of being injection molded. The plastic may also contain fibers made optionally made of glass, aramid, or other fibers with strengthening characteristics that are injected along with the plastic to enhance the strength and rigidity of the injection molded parts. Likewise terminal handle 35, rake head 110, scraper shovel blade 210, snow shovel head 310, and specialized hoe blade 410 can be made of the same or similar materials as above, or any other materials as would be recognized as suitable by those skilled in the art.

One very desirable characteristic of most of the preferred embodiment offset connectors 10, 20, 30, 40, 50, 60, 70, 80 is that they may be manufactured using a simple A/B two part mold tool. In other words, the geometry only requires two mold pieces that are closed by pressing the A and B mold parts together. Next, plastic is injected into the mold, and then the plastic is allowed to briefly cool. The mold parts are then separated from each other, and the molded plastic part is then removed from the mold for any further treatments or processing as required or desired. In order for a mold to be compatible with this simple A/B two parts mold tool, the geometry of the part being molded must permit the mold parts to be removed, preferably in a linear and opposed direction. By designing the parts as illustrated, the A and B mold parts can be designed to travel in a direction parallel to the longitudinal axis of handle segment receiver sockets 13, 14 and handle segments 32, 34. Where a grip is to be formed unitarily, such as in the case of preferred embodiment offset connectors 30, 40, 50, 60, 70, 80 the A and B mold tools close from opposite sides or faces of what becomes the grip 36, 46, 56, 66, 76, 86. Those skilled in the molding art will understand the processes and implications from a reading of the foregoing in light of the illustrations. As a result of this A/B two parts molding, the mold tooling costs and production complexity are both significantly decreased, and yet, as apparent from the illustrations herein, the resulting preferred embodiment offset connectors 10, 20, 30, 40, 50, 60, 70, 80 may still be very feature rich.

Some preferred embodiments have a handle which is directly attached to the handle segments 32, 34, either directly to the offset connector or allowed to slide or reciprocate along the handle segment longitudinal axes. While handle segments 32, 34 are depicted as having equal lengths, they may alternatively be cut to different lengths allowing for different ergonomics. Additionally, while only one offset connector is illustrated in each of FIGS. 9-12, it will be understood that more than one of any of the preferred embodiment offset connectors 10, 20, 30, 40, 50, 60, 70, 80 may be incorporated into a single hand tool or implement. For exemplary and non-limiting purpose, a hand tool may be provided with a very long handle by combining two handle segments 32, 34 coupled together using any one of the preferred embodiment offset connectors 10, 20, 30, 40, 50, 60, 70, 80. Alternatively, and again solely for illustrative and non-limiting purpose, an even smaller shipping and retail package may be devised for hand tool blade 410 by using three or more relatively shorter handle segments in combination with the appropriate number of offset connectors.

Some additional benefits which are made apparent to those skilled in the art by virtue of the present disclosure include reduced cost and increased ergonomic benefit. In some embodiments the cost is reduced by using a single common offset connector which is injection molded, in combination with separately injection molded grips that are readily selected as the end tool is being picked for shipping, to provide for easy consumer assembly rather than factory assembly of the product. In other embodiments, the grip(s) and offset connector are simultaneously molded, which reduces tooling and production costs, but may increase the amount of inventoried plastic. All embodiments reduce the length of the shipped or inventoried package.

The increased ergonomic benefit comes from having a secondary hand grip which is located part way down the shaft of tool. Further benefit comes from the overlapping offset parallel handle segments 32, 34. The overlapping offset parallel handle segments provide additional vertical drop for the tool, while providing a strong connection that acts like a small bend without the increased cost of compound bending or forming of a metal or wooden handle.

Figure 19:
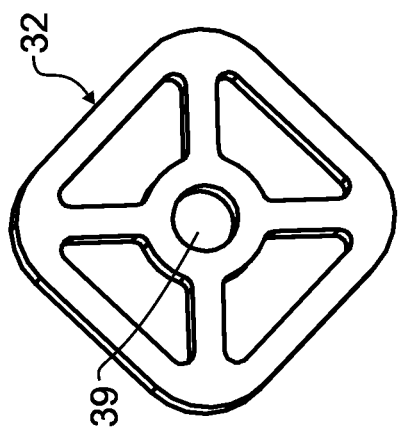
FIG. 19 illustrates a preferred embodiment of a handle segment from an end and slightly projected view.

Handle segments 32, 34 most preferably have a consistent cross section throughout their length, so they readily can be cut to any desired handle segment length. There are several exemplary embodiments for handle segments 32, 34. A first embodiment depicted in FIGS. 18 and 19 is an extruded square exterior "tube" with a hollow X shaped internal pattern extending from the corners of the square and thereby defining diagonals, with a central thread hole 39. This central thread hole 39 is configured to serve as the thread receiving mechanism for a fastener. As a result, end screws are passed through end screw plate screw connections 11, 12 and into the central thread hole 39 of handle segments 32, 34. The internal X-geometry and central threaded hole 39 provide an increased stiffness, essentially acting as internal reinforcement for the handle segment.

A second embodiment for handle segments 32, 34 is a hollow tube which for exemplary and non-limiting purpose may be made of metal such as aluminum, preferably factory extruded and cut to length. Subsequent thereto, a commercially available tabbed insert and end cap is inserted into the ends of the handle segments 32, 34. The commercially available tabbed insert and end cap has a central threaded portion that in combination acts like a square nut that cannot be pulled out of the handle segment but can be pushed in with ease. This tabbed insert and end cap is configured and therefore ready to receive an end screw from end screw connections 11, 12 and thereby join handle segments 32, 34 to offset connector 10.

In a further alternative embodiment, a square nut is welded into the open ends of handle segments 32, 34. As may be apparent, this welding will practically be performed at the factory, leaving no opportunity for a customer to adjust the length of the handle segments 32, 34. In the case of the tabbed insert and end cap, a purchaser can cut handle segments 32, 34 to a desired length, drive the insert and end cap into the handle segments 32, 34, and then assemble a handle. In this case, either the customer is only able to cut to a length at the time of first assembly, or the customer will need to be provided with more than one set of tabbed insert and end caps. However, the use of an extruded or pultruded tube with the internal X-shaped pattern and central thread hole 39 may be cut to any length by either the factory or end-user, and will still readily be coupled using a suitable fastener.

As described herein above, the preferred embodiment offset connectors 10, 20, 30, 40, 50, 60, 70, 80 offer many advantages not found in the prior art. Nevertheless, for some applications fewer advantageous features may be deemed acceptable or suitable by a designer. In consideration thereof, a number of additional alternative embodiment offset connectors and implements are also illustrated herein below in accord with a more limited subset of features of the present invention.

FIG. 20 illustrates a first alternative embodiment scraper implement 500 having an offset connector and secondary grip in combination with a pair of handle segments, scraper shovel blade, and primary terminating handle grip. In this scraper implement 500, three offset connectors 510, 520, 530 together provide a person with much flexibility for precision adjustment, or for repetition of lower force tasks. More particularly, each of these offset connectors 510, 520, 530 space and align handle segments 32, 34 in parallel. However, handle segments 32, 34 each pass entirely through offset connector 510, rather than terminating at offset connector 510. This means that, absent a locked set screw or the like, offset connector 510 is free to reciprocated along the longitudinal axes of handle segments 32, 34. Similarly, offset connectors 520, 530 might be provided with a set screw or the like to prevent handle segments 32, 34 from collapsing on each other, but the use of set screws is not a requirement for use. Consequently, in those applications demanding an ability for the scraper shovel handle to shorten, lengthen, to slide back and forth, or for very precise setting of both the auxiliary grip and the overall handle length, these sliding components can be particularly beneficial.

Figure 21:
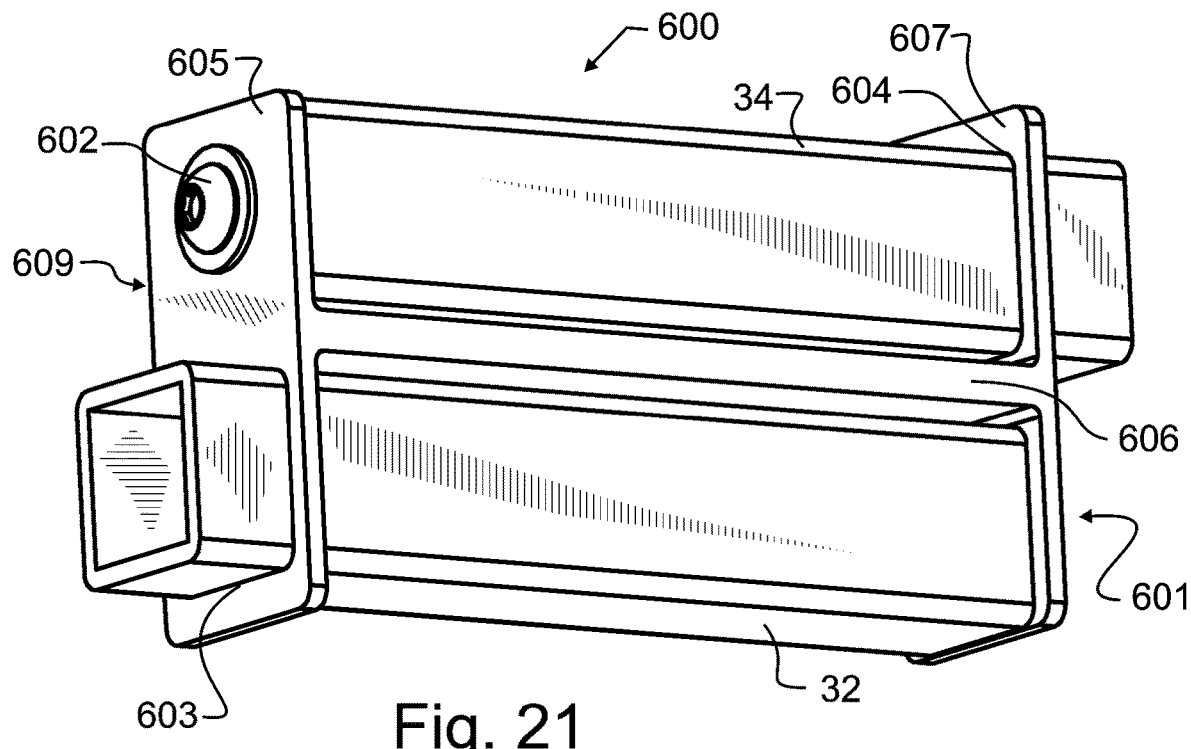
FIG. 21 illustrates a first alternative embodiment offset connector, and secondary D-grip, designed in accord with the teachings of the present invention from a projected view.

FIG. 21 illustrates a first alternative embodiment offset connector 600 absent a secondary grip. In this embodiment, offset connector body 609 is fabricated in an approximate I shape including a first end plate 605, a second end plate 607, and an intermediate divider 606. This offset connector body 609 facilitates the overlapping of two handle segments 32, 34, in a minimal configuration. No grips or adjustments are provided, just this I-shaped offset connector body 609.

Figure 22:
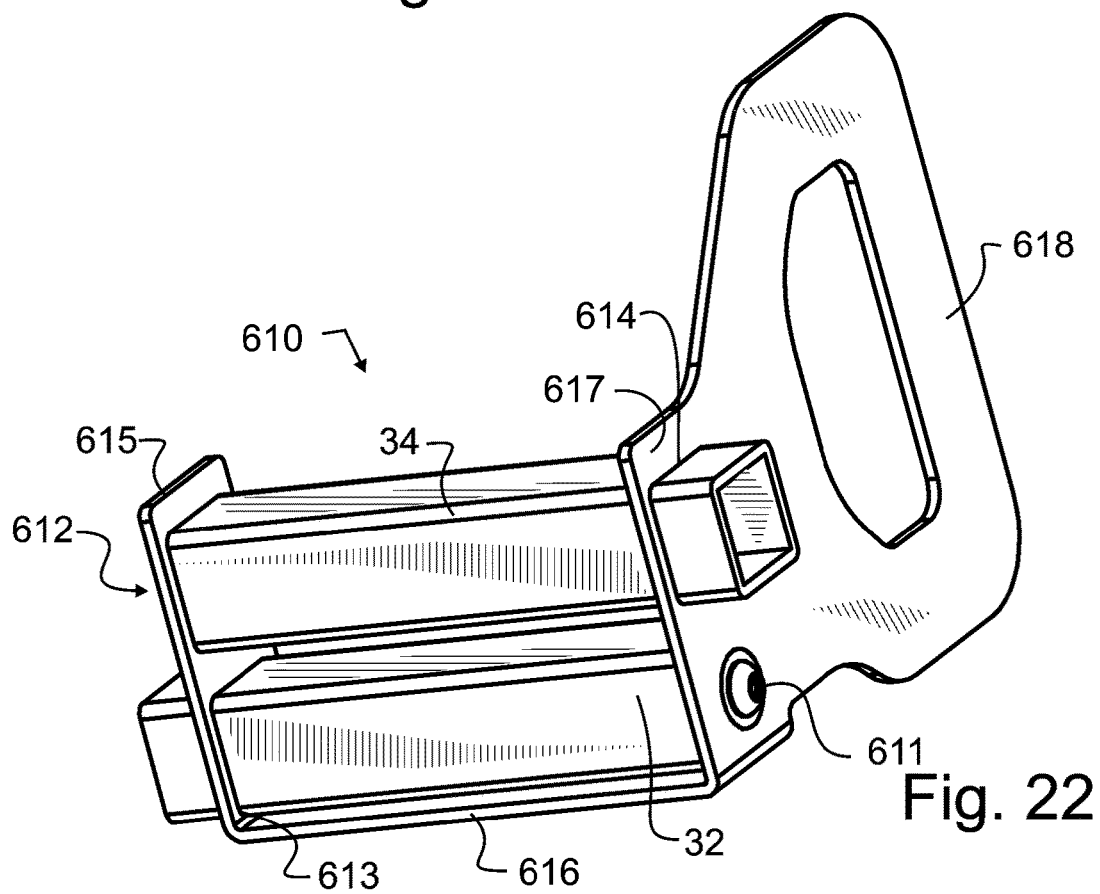
FIG. 22 illustrates a second alternative embodiment offset connector, and secondary D-grip, designed in accord with the teachings of the present invention from a projected view.

While FIG. 21 is a relatively minimal construction, the perpendicular plates defined by first and second end plates 605, 607, and intermediate divider 606 require manufacturing processes that in some cases are less desirable. In consideration thereof, FIG. 22 illustrates a second alternative embodiment offset connector and secondary D-grip 610, designed in accord with the teachings of the present invention. While functionally quite similar, primarily only differing in the presence of handle 618 and the shift from a divider 606 running in between handle segments 32, 34 to a divider 616 along one side, this second alternative embodiment offset connector and secondary D-grip 610 is preferably produced using very different machinery. Second alternative embodiment offset connector and secondary D-grip 610 is readily fabricated from sheet stock, such as sheet steel or aluminum. In such case, the sheet stock will be punched to form the appropriate apertures for 611-614 and handle 618, and punched to separate the entire body outline in flat form from a sheet stock source material. Next, the punched metal will be bent in a press brake or the like to define the 90 degree bends between offset supports 615, 617 and divider 616. Metal stamping is, in many cases, a very cost effective manufacturing technique.

Figure 23:
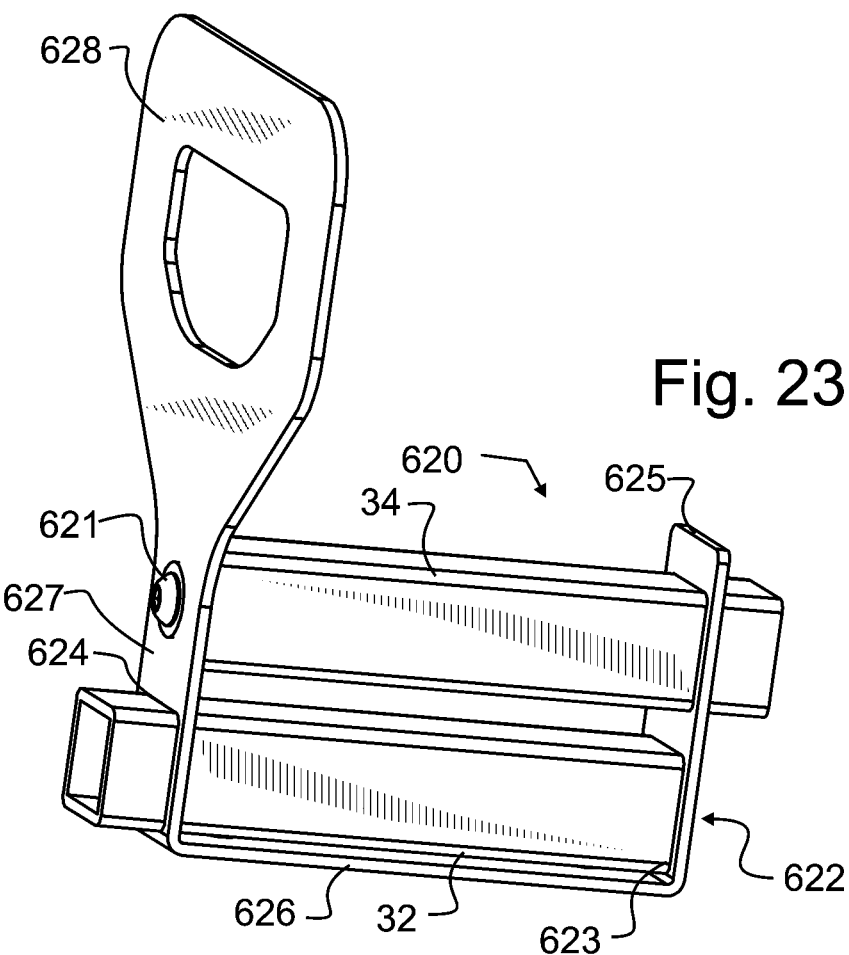
FIGS. 23-25 illustrate third, fourth, and fifth alternative embodiment offset connectors and secondary D-grip, designed in accord with the teachings of the present invention from projected view, projected view, and front side elevational view, respectively.
Figure 24:
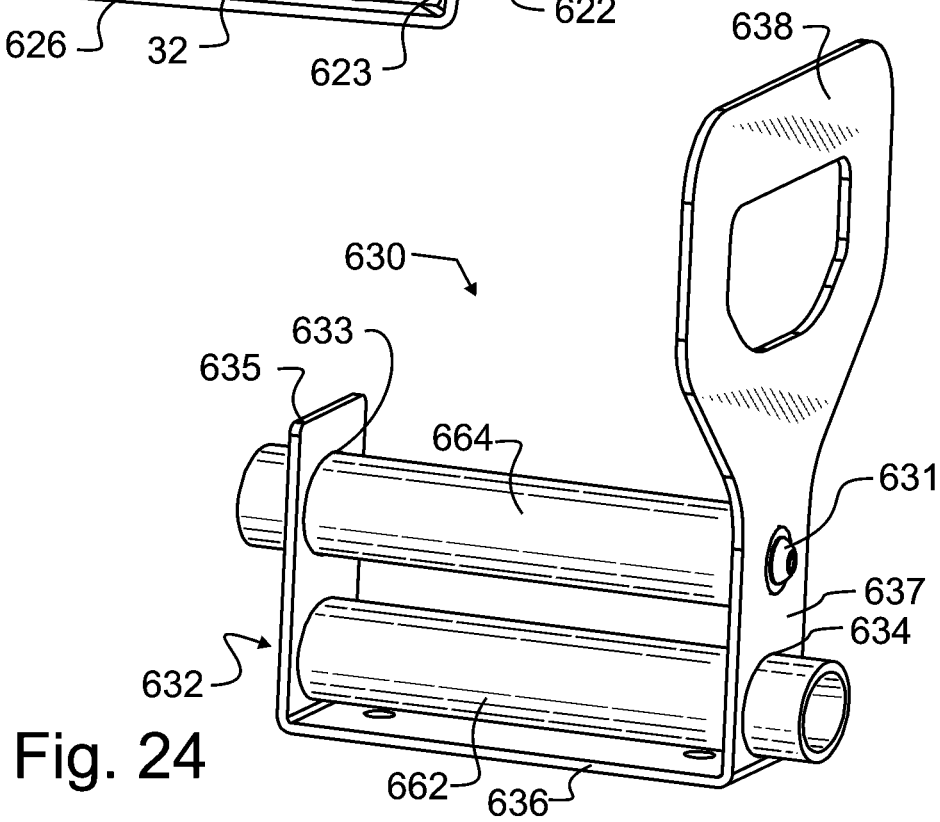
Figure 25:
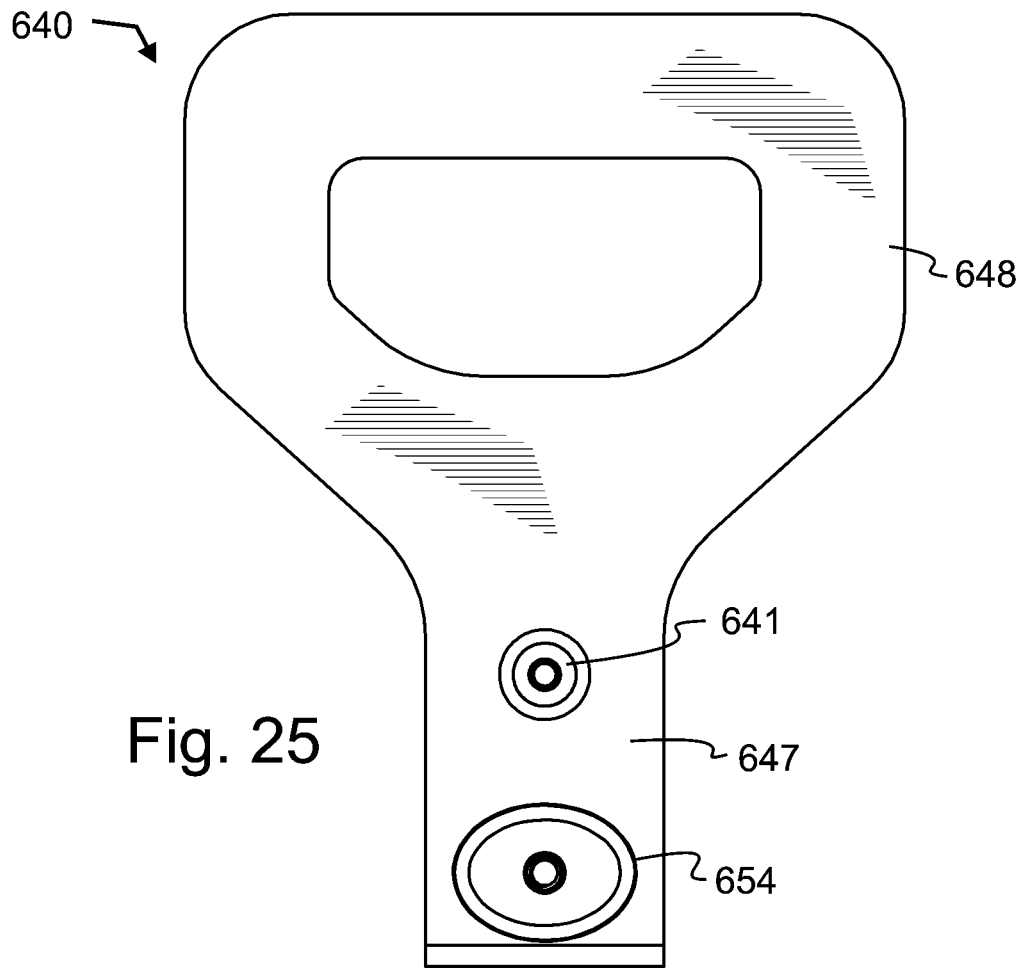

FIGS. 23-25 illustrate third, fourth, and fifth alternative embodiment offset connectors 620, 630, 640, each similar to the second alternative embodiment offset connector 610 of FIG. 22 in the use of a geometry well suited for metal stamping and bending, though as may be understood, other suitable manufacturing techniques may also be used. However, each of these incorporate handle segments of different geometries. So while third alternative embodiment offset connector 620 of FIG. 23 still uses the square or rectangular tubing for fabricating handle segments 32, 34, fourth alternative embodiment offset connector 630 incorporates round, potentially rotatable tube. FIG. 25 illustrates the fifth alternative embodiment using a non-rotatable hollow oval tube.

Figure 26:
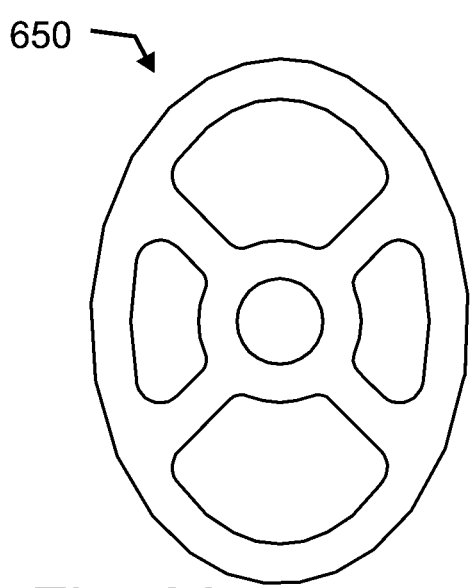
FIG. 26 illustrates a first alternative embodiment non-rotating handle from an end elevational view.
Figure 27:
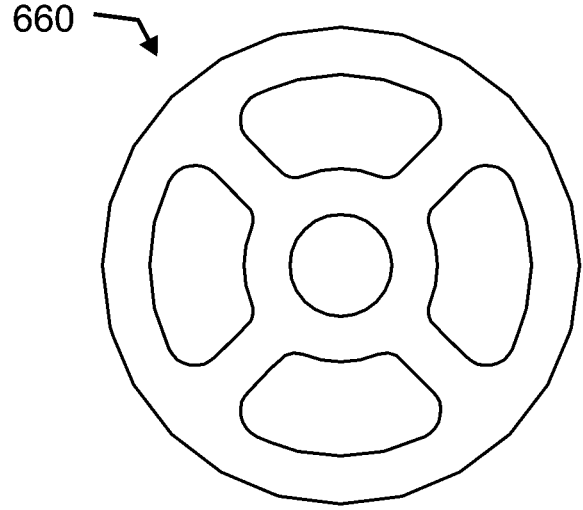
FIG. 27 illustrates a second alternative embodiment rotating handle from an end elevational view.
Figure 28:
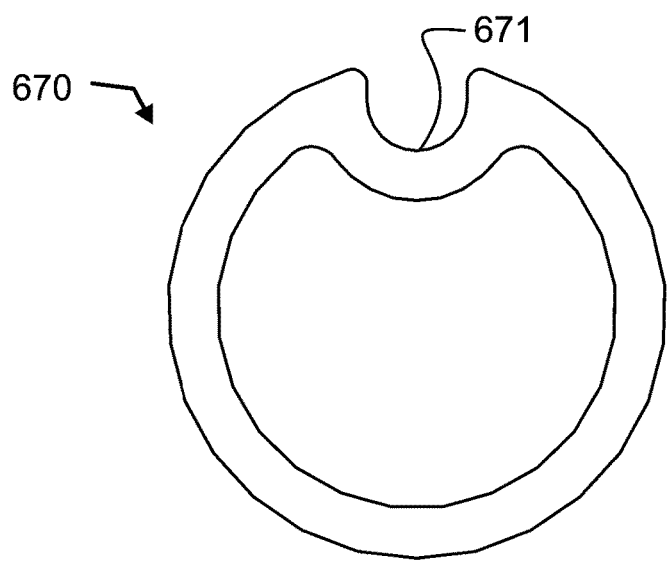
FIG. 28 illustrates a third alternative embodiment non-rotating handle from an end elevational view.
Figure 29:
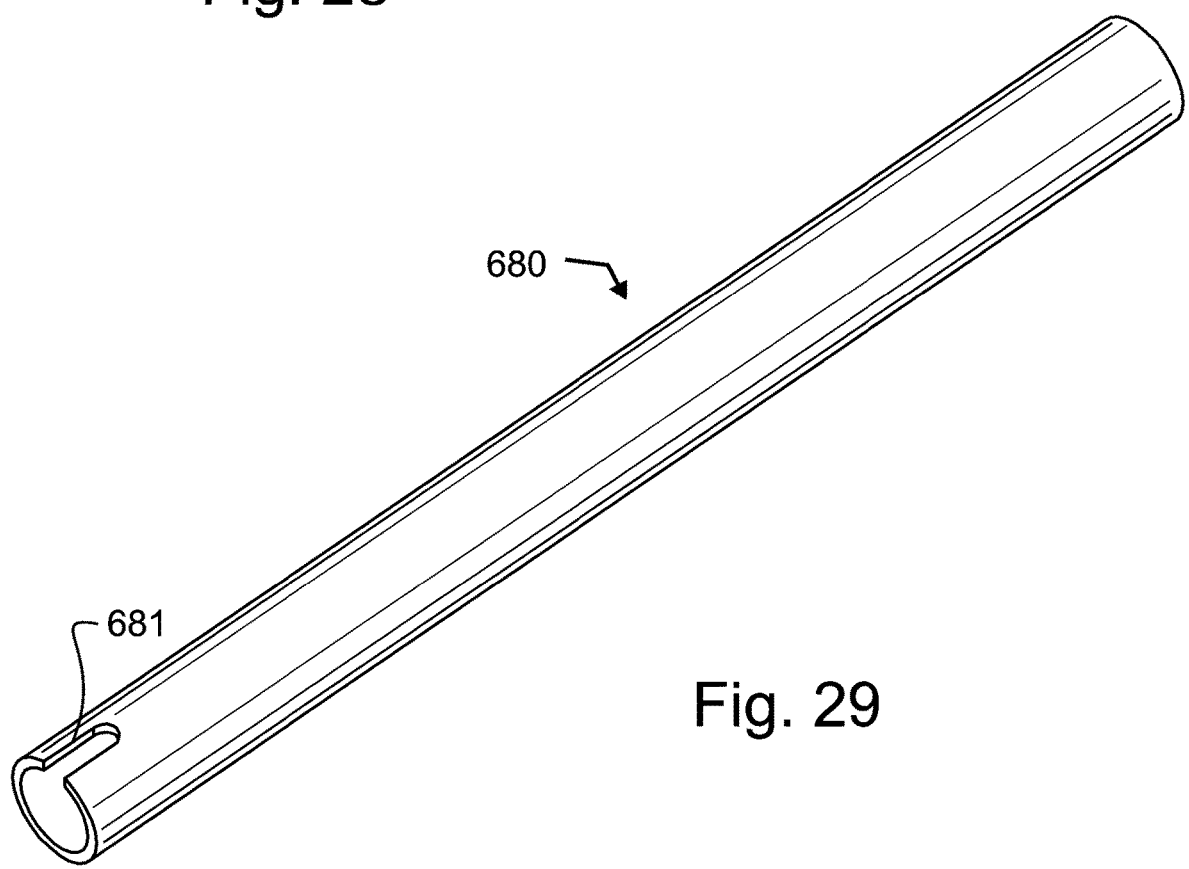
FIG. 29 illustrates a fourth alternative embodiment non-rotating handle from a projected view.

FIG. 26 illustrates a first alternative embodiment non-rotating handle from an end elevational view, revealing a non-rotatable oval tube with an internal X pattern reinforcement and an inner tube for fasteners to thread into. FIG. 27 illustrates a second alternative embodiment rotating handle, while FIGS. 28 and 29 illustrate ways to prevent rotation of otherwise generally round pipes or extrusions. In FIG. 28, a third alternative embodiment non-rotating handle 670 has a longitudinally extensive depression 671, resembling a keyway. As long as an offset connector used therewith has an appropriate key within a handle segment receiver socket, then handle 670 will be prevented from rotating. While the fourth alternative embodiment non-rotating handle 680 illustrated in FIG. 29 is almost entirely cylindrical, there is a small longitudinal notch 681 cut adjacent an end. This notch 681 can likewise engage with an appropriate key within a handle segment receiver socket to prevent rotation. While handles 670, 680 are illustrated as being hollow, it will be understood that like handles 650, 660, these will be designed either with or without the internal X pattern metal.

A fastener parallel to the longitudinal axis of the handle segment is most preferred, as clearly described and illustrated herein above such as end screws 91, 92 depicted in FIG. 18, for the reasons already enumerated herein above. Nevertheless, in some alternative embodiments contemplated herein one or more fasteners are additionally be provided that pass transversely through one or more of the handle segments 32, 34. In yet further alternative embodiments contemplated herein, one or more fasteners are alternatively provided that pass transversely through one or more of the handle segments 32, 34.

FIG. 30 illustrates a sixth alternative embodiment offset connector 690 and secondary grip 696 in combination with a pair of handle segments 32, 34, scraper shovel blade, and primary terminating handle grip. As illustrated therein, transverse holes 697 may be formed at spaced locations along the length of the handle segments. Into these transverse holes, a plurality of fasteners 691, 692 may be affixed.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:
1. A hand implement, comprising:
a primary hand grip;
an implement head distal to said primary hand grip; and
a parallel offset handle connector intermediate between said primary hand grip and said implement head, said parallel offset handle connector comprising:
    a first end plate having a first receiver socket and a first handle retention passthrough coaxial with said first receiver socket;
    a second end plate having a second receiver socket and a second handle retention passthrough coaxial with said second receiver socket;
    a spacer adjacent to and connecting the first and second end plates;
    a first handle segment having a first longitudinal end and a second longitudinal end distal to said first longitudinal end, said first longitudinal end of said first handle segment inserted into the first receiver socket and receiving a first fastener extending through the first handle retention passthrough and said second longitudinal end of said first handle segment affixed to said primary hand grip;
    a second handle segment having a first longitudinal end and a second longitudinal end distal to said first longitudinal end, said first longitudinal end of said second handle segment inserted into the second receiver socket and receiving a second fastener extending through the second handle retention passthrough and said second longitudinal end of said second handle segment affixed to said implement head;
    wherein the first handle segment is offset from and overlaps the second handle segment; and
    wherein the first and second end plates align the first and second handle segments longitudinally parallel to one another.

2. The hand implement of claim 1, further comprising a protrusion extending from said parallel offset handle connector and defining a secondary hand grip.

3. The hand implement of claim 2, wherein said secondary hand grip extends from said spacer.

4. The hand implement of claim 2, wherein said secondary hand grip extends from at least one of said first and second end plates.

5. The hand implement of claim 2, wherein said secondary hand grip is slidably attached along or onto said spacer.

6. The hand implement of claim 2, wherein said secondary hand grip is secured through one of the first and second handle retention passthroughs.

7. The hand implement of claim 1, wherein said first and second offset and overlapping handle segments are configured to engage with said first and second receiver sockets in a manner that prevents each of said first and second offset and overlapping handle segments from rotating about a longitudinal axis relative to each of said first and second receiver sockets.

8. The hand implement of claim 7, wherein said first and second offset and overlapping handle segments each comprise a non-circular cross-section, and said first and second receiver sockets each comprise a non-cylindrical opening.

* * * * *